US011586220B2

(12) United States Patent
Sujan et al.

(10) Patent No.: US 11,586,220 B2
(45) Date of Patent: Feb. 21, 2023

(54) VEHICLE PLATOON CONTROLS PROVIDING IMPROVED FUEL EFFICIENCY AND VEHICLE COLLISION MITIGATION

(71) Applicant: Cummins Inc., Columbus, IN (US)

(72) Inventors: Vivek Anand Sujan, Columbus, IN (US); Parul Chadha, Columbus, IN (US); Archit N. Koti, Columbus, IN (US)

(73) Assignee: Cummins Inc., Columbus, IN (US)

( * ) Notice: Subject to any disclaimer, the term of this patent is extended or adjusted under 35 U.S.C. 154(b) by 160 days.

(21) Appl. No.: 16/892,920

(22) Filed: Jun. 4, 2020

(65) Prior Publication Data

US 2020/0387167 A1 Dec. 10, 2020

Related U.S. Application Data

(60) Provisional application No. 62/857,077, filed on Jun. 4, 2019.

(51) Int. Cl.
*G05D 1/02* (2020.01)
*G05D 1/00* (2006.01)
(Continued)

(52) U.S. Cl.
CPC ......... *G05D 1/0289* (2013.01); *B60W 30/143* (2013.01); *B60W 30/16* (2013.01); *G05D 1/0027* (2013.01); *G08G 1/161* (2013.01); *G08G 1/22* (2013.01); *B60W 2520/00* (2013.01); *B60W 2554/80* (2020.02)

(58) Field of Classification Search
CPC . G05D 1/0289; G05D 1/0027; B60W 30/143; B60W 30/16; B60W 2554/80; B60W 2520/00; G08G 1/161; G08G 1/22
See application file for complete search history.

(56) References Cited

U.S. PATENT DOCUMENTS 6,625,540 B2  9/2003  Kageyama
9,202,379 B2  12/2015 Yamashiro
(Continued)

FOREIGN PATENT DOCUMENTS

JP       5617198    * 11/2014  ............ B60W 30/16
WO    2012105889      8/2012
(Continued)

OTHER PUBLICATIONS

Machine translation for JP5617198 (Year: 2014).*

*Primary Examiner* — Jeff A Burke
*Assistant Examiner* — Mohamad O El Sayah
(74) *Attorney, Agent, or Firm* — Taft, Stettinius & Hollister LLP

(57) ABSTRACT

An electronic control system is configured to control operation of a platoon including a plurality of vehicles. The electronic control system may be configured one or more of operate each of the vehicles to provide operation emulating the lowest non-platooning vehicle performance capability among the plurality of vehicles of the platoon, operate an individualized predictive cruise control (IPCC) process for each of the vehicles and a corresponding supervisory safety process for the platoon, and operate a cooperative predictive cruise control (CPCC) process for each of the vehicles and a corresponding supervisory safety process for the platoon.

24 Claims, 16 Drawing Sheets

(51) Int. Cl.
  *G08G 1/00*   (2006.01)
  *B60W 30/14*  (2006.01)
  *B60W 30/16*  (2020.01)
  *G08G 1/16*   (2006.01)

(56) References Cited

U.S. PATENT DOCUMENTS

| | | | |
|---|---|---|---|
| 10,073,464 B2 | 9/2018 | Pilkington | |
| 2016/0054736 A1* | 2/2016 | Koi | B60W 30/00 |
| | | | 701/96 |
| 2017/0001639 A1* | 1/2017 | Dempsey | G08G 1/16 |
| 2017/0210404 A1* | 7/2017 | Brooks | B61L 23/007 |
| 2018/0356830 A1* | 12/2018 | Haghighat | B60W 10/18 |
| 2019/0023271 A1* | 1/2019 | Young | F02D 41/021 |
| 2021/0240201 A1* | 8/2021 | Okuyama | G05D 1/0022 |

FOREIGN PATENT DOCUMENTS

| | | |
|---|---|---|
| WO | 2018043753 | 3/2018 |
| WO | 2018050356 | 3/2018 |

\* cited by examiner

Fuel Economy (MPG)

| Vehicle Configurations (no skirt, no boat tails) | Lead Vehicle Mass (lbs) / Following Vehicle Mass (lbs) | | | | |
|---|---|---|---|---|---|
| | 55,000 / 55,000 | 65,000 / 65,000 | 80,000 / 80,000 | 80,000 / 40,000 | 40,000 / 80,000 |
| Baseline Truck | 7.46 | 7.01 | 6.42 | 7.23 | 7.23 |
| Baseline Truck with PCC | 7.67 | 7.20 | 6.57 | 7.42 | 7.42 |
| Platooning without PCC | 7.94 | 7.41 | 6.73 | 8.02 | 7.71 |
| Platooning, Lead with PCC, Trail without PCC, constant following distance | 8.18 | 7.58 | 6.86 | 8.24 | 8.02 |
| Platooning, Lead with PCC, Trail with PCC, min/max set point following distance | 8.19 | 7.61 | 6.88 | 8.25 | 8.03 |
| Platooning, Lead with PCC, Trail with PCC, following distance entitlement | 8.20 | 7.63 | 6.92 | 8.26 | 8.06 |

Fig. 10

Fuel Economy Improvement (%)

| Vehicle Configurations (no skirt, no boat tails) | 55,000 / 55,000 | Lead Vehicle Mass (lbs) / Following Vehicle Mass (lbs) | | | |
|---|---|---|---|---|---|
| | | 65,000 / 65,000 | 80,000 / 80,000 | 80,000/ 40,000 | 40,000 / 80,000 |
| Baseline Truck with PCC | 2.85 % | 2.67 % | 2.33 % | 2.56 % | 2.56 % |
| Platooning without PCC | 3.44 % | 2.88 % | 2.55 % | 8.20 % | 3.98 % |
| Platooning, Lead with PCC, Trail without PCC, constant following distance | 3.05 % | 2.31 % | 1.87 % | 2.73 % | 4.00 % |
| Platooning, Lead with PCC, Trail with PCC, min/max set point following distance | 0.18 % | 0.37 % | 0.28 % | 0.07 % | 0.19 % |
| Platooning, Lead with PCC, Trail with PCC, following distance entitlement | 0.09 % | 0.25 % | 0.59 % | 0.09 % | 0.35 % |

Fig. 11

Fuel Economy (MPG)

| Vehicle Configurations (with skirt and boat tails) | Lead Vehicle Mass (lbs) / Following Vehicle Mass (lbs) | | | | |
|---|---|---|---|---|---|
| | 55,000 / 55,000 | 65,000 / 65,000 | 80,000 / 80,000 | 80,000 / 40,000 | 40,000 / 80,000 |
| Baseline Truck | 7.83 | 7.32 | 6.67 | 7.57 | 7.57 |
| Baseline Truck with PCC | 8.04 | 7.50 | 6.80 | 7.75 | 7.75 |
| Platooning without PCC | 8.40 | 7.78 | 7.02 | 8.52 | 8.12 |
| Platooning, Lead with PCC, Trail without PCC, constant following distance | 8.64 | 7.96 | 7.16 | 8.75 | 8.39 |
| Platooning, Lead with PCC, Trail with PCC, min/max set point following distance | 8.69 | 8.01 | 7.21 | 8.77 | 8.42 |
| Platooning, Lead with PCC, Trail with PCC, following distance entitlement | 8.69 | 8.04 | 7.25 | 8.80 | 8.48 |

Fig. 12

Fuel Economy Improvement (%)

| Vehicle Configurations (with skirt and boat tails) | Lead Vehicle Mass (lbs) / Following Vehicle Mass (lbs) | | | | |
|---|---|---|---|---|---|
| | 55,000 / 55,000 | 65,000 / 65,000 | 80,000 / 80,000 | 80,000/ 40,000 | 40,000 / 80,000 |
| Baseline Truck with PCC | 2.70 % | 2.50 % | 2.05 % | 2.37 % | 2.37 % |
| Platooning without PCC | 7.32 % | 6.42 % | 5.33 % | 12.56 % | 7.19 % |
| Platooning, Lead with PCC, Trail without PCC, constant following distance | 2.86 % | 2.27 % | 1.98 % | 2.71 % | 3.34 % |
| Platooning, Lead with PCC, Trail with PCC, min/max set point following distance | 0.54 % | 0.56 % | 0.61 % | 0.22 % | 0.37 % |
| Platooning, Lead with PCC, Trail with PCC, following distance entitlement | 0.04 % | 0.46 % | 0.55 % | 0.33 % | 0.68 % |

Fig. 13

VEHICLE PLATOON CONTROLS PROVIDING IMPROVED FUEL EFFICIENCY AND VEHICLE COLLISION MITIGATION

CROSS-REFERENCE

The present application claims priority to and the benefit of U.S. Application No. 62/857,077 filed on Jun. 4, 2020, which is hereby incorporated by reference.

BACKGROUND

The present disclosure relates to vehicle platoon controls providing improved fuel efficiency and vehicle collision mitigation. A vehicle platoon typically comprises a group of vehicles may travel in close proximity using radar, LIDAR, proximity sensor information, or camera information, and in some instances, inter-vehicle coordination facilitated by some form of direct or indirect (e.g., cloud-based) communication. Current proposals for controlling vehicle platoons, while recognizing some potential benefits, face a number of challenges and suffer from a number of drawbacks, limitations, and shortcomings including those respecting fuel efficiency and safety. There remains a significant need for the unique apparatuses, methods, systems, and techniques disclosed herein.

DISCLOSURE OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain illustrative embodiments, including those illustrated in the figures, and specific language will be used to describe the same. It shall nevertheless be understood that no limitation of the scope of the invention is thereby created and that the invention includes and protects such alterations, modifications, and further applications of the illustrative embodiments as would occur to one skilled in the art.

SUMMARY OF THE DISCLOSURE

Illustrative embodiments include unique apparatuses, methods, and systems of prime mover power or performance shaping. Further embodiments, forms, objects, features, advantages, aspects, and benefits shall become apparent from the following description and drawings.

BRIEF DESCRIPTION OF THE DRAWINGS

FIGS. 10-13 are tables illustrating variation in fuel economy for several vehicle operating modalities.

DETAILED DESCRIPTION OF ILLUSTRATIVE EMBODIMENTS

Figure 1:
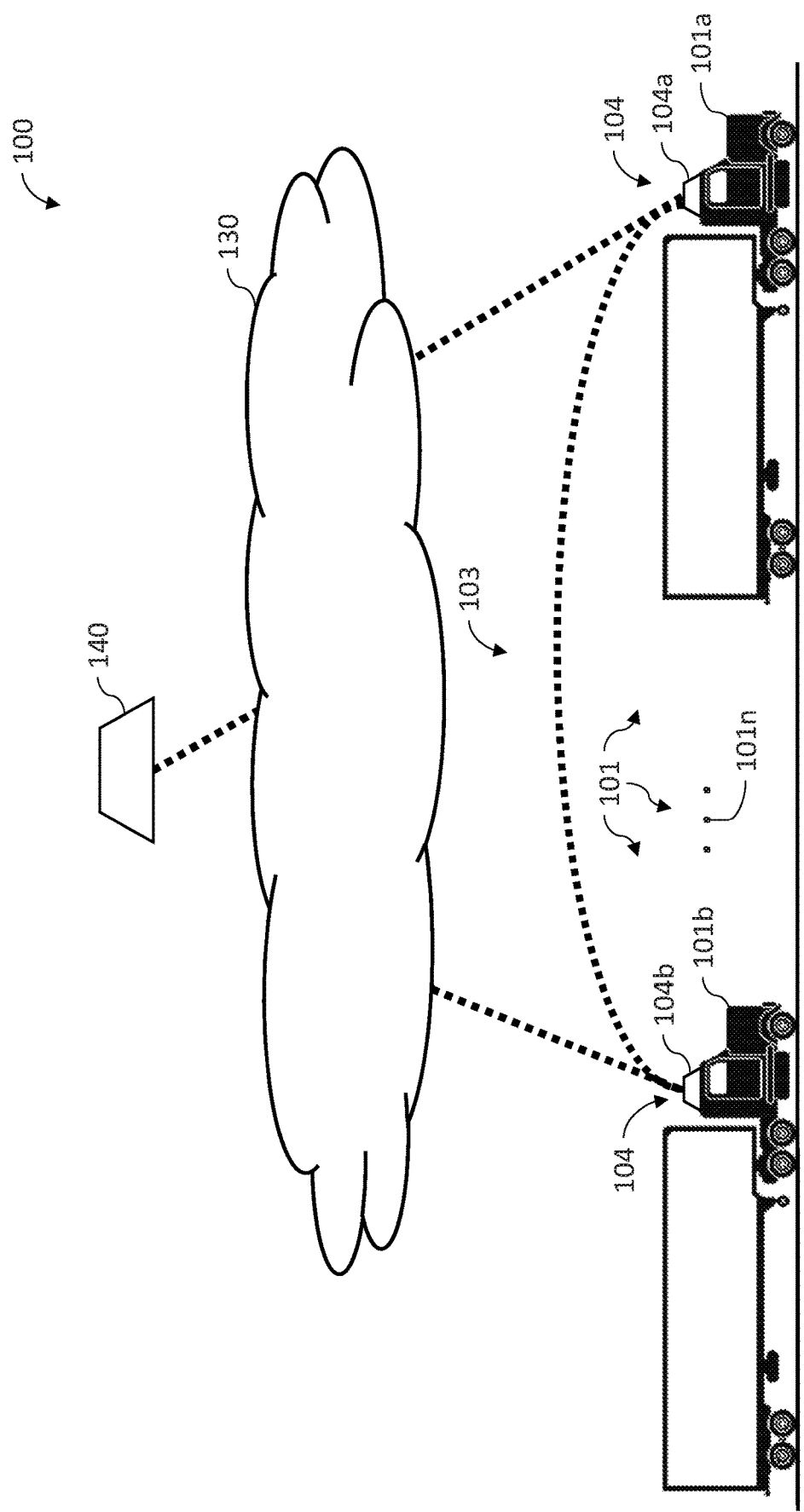
FIG. 1 is a schematic illustration of certain aspects of an illustrative vehicle platoon control system.

With reference to FIG. 1, there is illustrated a schematic view of an illustrative vehicle platoon control system (VPCS) 100 which is configured to control operation of a vehicle platoon 103 which includes a plurality of vehicles 101a, 101b and potentially additional vehicles 101n as denoted by an ellipsis. Vehicles 101a, 101b, and other vehicles 101n may be referred to individually as a vehicle 101 and collectively as vehicles 101 or collectively as vehicle platoon 103. While vehicle platoon 103 is illustrated as comprising at least three vehicles 101, it shall be appreciated vehicle platoons according to the present disclosure may comprise any number of two or more vehicles traveling in proximity to one another such that information about characteristics, operation and/or performance of one or more of the vehicles can be obtained and processed to adjust or tune the power or performance characteristics of one or more of the vehicles in the cohort. Such processing may occur on-board one or more of the vehicles or at an off-board computing system in communication with one or more of the vehicles. It shall be further appreciated that certain forms of vehicle platoon operation may comprise platooning operation in which two or more vehicles actively participate in coordinating operation of the vehicle platoon. On the other hand, certain forms of vehicle platoon operation do not require the active participation of multiple vehicles. For example, one vehicle can sense or receive information about characteristics, operation and/or performance of one or more other vehicles in the cohort and process that information along with information about its own characteristics, operation and/or performance to adjust its own power or performance characteristics.

Vehicles 101 may be a variety of types of vehicles such as trucks, tractor-trailers, box trucks, buses, and passenger cars, among others. The vehicles 101 illustrated in FIG. 1 are depicted as tractor-trailers, but other types of vehicles are contemplated herein. Some embodiments contemplate that vehicles 101 may each be the same or similar types of vehicles, for example, in the case of a commonly managed vehicle fleet. Some embodiments contemplate that vehicles 101 may comprise different types or classes of vehicles, for example, semi tractor-trailers and passenger cars. Each vehicle 101 includes a prime mover (not visible in the illustrated view), such as an internal combustion engine or hybrid engine-electric system, structured to output power to propel the vehicle 101. Some embodiments contemplate that prime movers may each be the same or similar types of prime movers, for example, in the case of a commonly managed vehicle fleet. Some embodiments contemplate that prime movers may comprise different types or classes of prime movers, for example, prime movers of different sizes, powers or types (e.g., diesel engine powertrains, gasoline engine powertrains, natural gas powertrains, hybrid-electric powertrains, and electric powertrains). For ease of description prime mover may be referred to herein as an engine, however, it shall be understood that references to an engine also apply to and include other types of prime movers.

Vehicle platoon 103 is illustrated in a platooning mode of operation in which the operation of vehicles 101 is controlled in a coordinated manner according to one or more of the techniques disclosed herein below to reduce net fuel consumption and increase net operating efficiency of the vehicle platoon 103. Each vehicle 101 utilizes one or more environmental sensors (not visible in the illustrated view) to determine its positioning relative to other vehicles in vehicle platoon 103. Examples of the types of sensor systems that may be utilized include radar systems, LIDAR systems, proximity sensor systems, camera systems, and combinations of these and/or other sensor systems. Each vehicle 101 in vehicle platoon 103 also includes a wireless communication system allowing vehicle-to-vehicle (V2V) communication or vehicle-to-X (V2X) communication where X denotes a variety of possible types of external networks including, for example, networks associated with stationary infrastructure assets.

Each vehicle 101 includes a vehicle electronic control system (VECS)(e.g., VECS 104a of vehicle 101a and VECS 104b of vehicle 101b) which is structured to control and monitor operation of its respective vehicle 101, as well as to participate in one or more of the coordinated operation as disclosed herein, for example, as a component or part of a vehicle platoon controller (VPC). When configured to participate in one or more of the coordinated platooning operations as disclosed herein, VECS 104a and 104b (or controller components thereof, e.g., dedicated controllers or portions of controllers configured to participate in any of the coordinated platooning operations disclosed herein) provide one example of an electronic control system configured to control operation of a vehicle platoon. When so configured, VECS 104a and 104b (or controller components thereof) also provide one example of an electronic control system comprising a plurality of components provided on respective ones of each of a plurality of vehicles. A number of extensions, modifications, and variations of the illustrated examples are also contemplated as would occur to one of skill in the art with the benefit of the present disclosure.

Each VECS 104 typically comprises one or more integrated circuit-based electronic control units (ECU) or other control components which may be operatively coupled to one another over a communication bus or network such as a controller area network (CAN) and which are structure to implement various controls, for example, an engine ECU structured to control and monitor operation of an engine and engine accessories, a transmission ECU structured to control and monitor operation of a transmission, a wireless communication ECU structured to control ex-vehicle wireless communications, and one or more environmental sensor ECUs structured to control operation of an environmental sensor system may be provided. It shall be appreciated that the control logic and control processes disclosed herein may be performed by controllers or controls which are implemented in dedicated control components of VECS 104 (e.g., in a dedicated ECU or other dedicated control circuitry) or may be implemented in a distributed fashion across multiple control components of VECS (e.g., through coordinated operation of an engine ECU, a transmission ECU, a wireless communication ECU and an environmental sensor ECU).

The ECUs and other control components of VECS 104 may comprise digital circuitry, analog circuitry, or hybrid combinations of both of these types. The ECUs and other control components of VECS 104 can be programmable, an integrated state machine, or a hybrid combination thereof. The ECUs and other control components of VECs 104 can include one or more Arithmetic Logic Units (ALUs), Central Processing Units (CPUs), memories, limiters, conditioners, filters, format converters, or the like which are not shown to preserve clarity. In one form, the VECS 104 is of a programmable variety that executes algorithms and processes data in accordance with operating logic that is defined by executable program instructions stored in a non-transitory memory medium (e.g., software or firmware). Alternatively or additionally, operating logic for the VECS 104 can be at least partially defined by hardwired logic or other hardware.

It shall be appreciated that electronic control systems and components thereof disclosed herein may be configured to determine or obtain a parameter, quantity, value or other operand based upon another parameter, quantity, value or other operand in a number of manners including, for example, by calculation, computation, estimation or approximation, look-up table operation, receiving a parameter, quantity, value or other operand from one or more other components or systems and storing such received parameter, quantity, value or other operand in a non-transitory memory medium associated with the electronic control systems or components thereof, other determination techniques or techniques of obtaining as would occur to one of skill in the art with the benefit of the present disclosure, or combinations thereof. Likewise the disclosed acts of determination or determining or obtaining a parameter, quantity, value or other operand based upon another parameter, quantity, value or other operand may comprise a number acts including, for example, acts of calculation, computation, estimation or approximation, look-up table operation, receiving a parameter, quantity, value or other operand from one or more other components or systems and storing such received parameter, quantity, value or other operand in a non-transitory memory medium associated with the electronic control systems or components thereof, other determination techniques or techniques of obtaining as would occur to one of skill in the art with the benefit of the present disclosure, or combinations thereof.

The environmental sensor and wireless communication capabilities of vehicles 101 allow their operation to be coordinated using direct or indirect communication. For example, vehicles 101 may accelerate or brake simultaneously, or in a coordinated sequence, maintain a particular distance relative to one another, or maintain a particular offset relative to one another. Coordinated operation also allows a closer following distance between vehicles by compensating for or eliminating distance needed for human reaction. Coordinate operation of vehicle platoon 103 further allows for operation that reduces net fuel consumption or increases net efficiency of the vehicle platoon 103. One or more of the vehicles 101 may in some embodiments, be equipped with aerodynamic capability (wind assist panels on cab & trailer, aerodynamic tractor body) that creates a laminar flow of air (tunnel effect) that greatly reduces air drag. Other vehicles among vehicles 101 may be spaced close enough to the vehicle taking advantage of a wind break tunnel to increase fuel economy. It shall be appreciated that the controls disclosed herein can mitigate aerodynamic losses both by adjusting vehicle following distance(s) and vehicle offset.

Coordinated operation of vehicle platoon 103 may be provided at least in part by a vehicle platoon controller (VPC) which may be provided or implemented wholly or partially in a control system 140 remote from vehicle platoon, e.g., a cloud-based control system in operative communication with the VECS 104 of each of vehicles 101 via one or more communication networks 130. Embodiments where a VPC is provided or implemented wholly or partially in a control system 140 remote from vehicle platoon provide an example of an electronic control system configured to control operation of a vehicle platoon. Such embodiments also provide an example of an electronic control system comprising one or more control system components remote from each of the plurality of vehicles and configured to operatively communicate with one or more of the plurality of vehicles via one or more wireless communication networks. As noted above, the VPC may additionally or alternatively be provided, wholly or partially, on board one or more of vehicles 101, for examiner as a component of the VECS 104 of one or more of vehicles 101 or implemented in an independent electronic control system. In certain forms, the VPC may be distributed among two or more VECS 104 or other vehicle-based electronic control systems. Thus, it shall be appreciated that the VPC may be provided solely as a component of control system 140, solely as a component of one or more of the VECS 104 or in a distributed configuration including components of control system 140 and one or more of the VECS 104.

Figure 2:
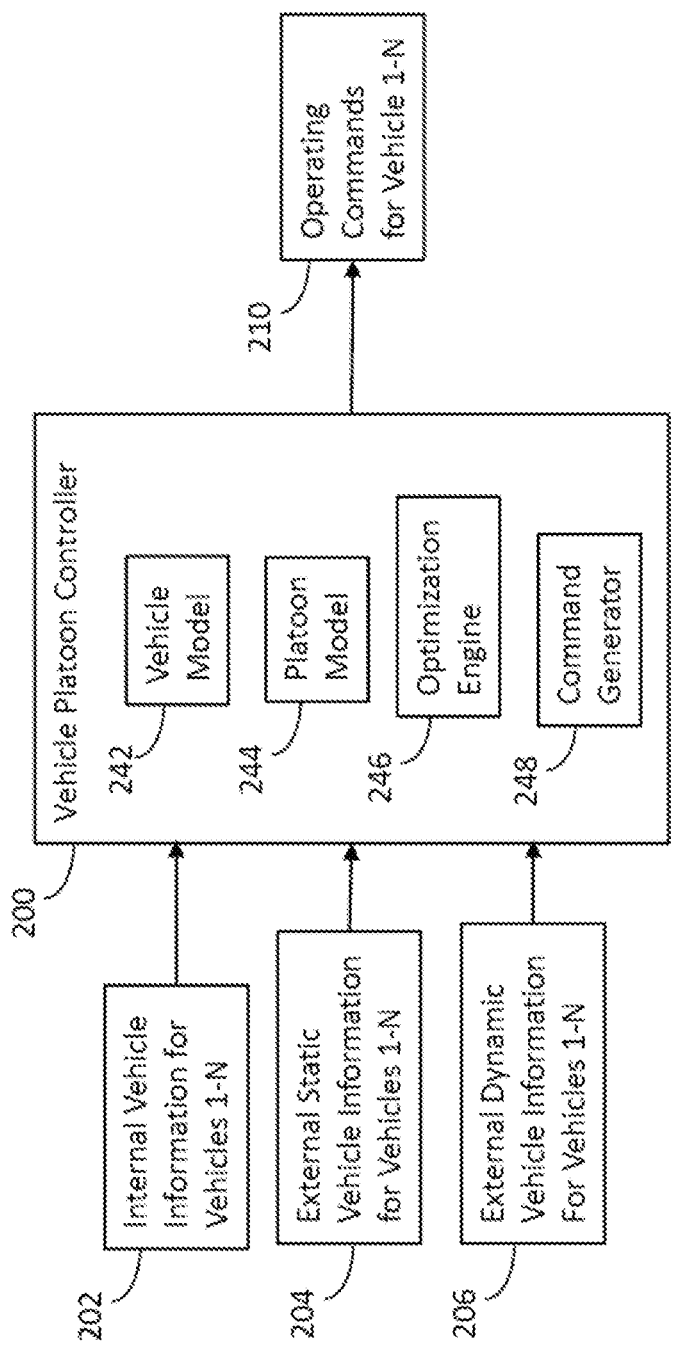
FIG. 2 is a schematic illustration of certain aspects of an illustrative vehicle platoon controller.

With reference to FIG. 2, there is illustrated a schematic depiction of one illustrative form of a vehicle platoon controller (VPC) 200. In the illustrated form, VPC 200 includes vehicle model logic 242, platoon model logic 244, optimization engine logic 246, and command generator logic 248. In other forms, VPC 200 may include additional or alternate control logic elements. It shall be appreciated that VPC 200 may be provided in any of the forms described herein. It shall be further appreciated that VPC 200 may be configured to perform any or all of the processes disclosed herein.

Vehicle model logic 242 may be configured to determine vehicle capability based on estimated and known vehicle parameters. Platoon model logic 244 may be configured to determine vehicle platoon capability based on estimated and known platoon information. Optimization engine logic 246 may be configured to tune vehicle performance based on both vehicle and cohort information. Command generator logic 248 may be configured to generate commands based on both vehicle and cohort information. VPC 200 may determine vehicle platoon operations including when to accelerate or brake simultaneously, or in a coordinated sequence to maintain a particular distance relative to one another, or maintain a particular offset relative to one another, which may reduce net fuel consumption or increases net efficiency of the vehicle platoon.

VPC 200 may be provided with inputs from block 202, 204, and 206. Block 202 provides internal vehicle information for vehicles 1-N (where 1 is a front vehicle and N is a number of rearward vehicles). Block 204 provides external static vehicle information for vehicles 1-N. Block 206 provides external dynamic vehicle information for vehicles 1-N. VPC 200 provides output block 210 which outputs operating commands to vehicles 1-N.

Internal vehicle information 202 may include information about vehicle components and immediate surrounding that changes with time and is available only at a given instance. This information may be available from on-board sensors and communication with other vehicle powertrain components, and may include, for example, engine speed, vehicle speed, temperature, humidity, and current road grade, among others. External static information 204 may include information about things outside of the vehicle that are time-invariant or change over a longer time frame (e.g., hourly, daily, weekly, over longer time periods, or seasonally). This information may be available from map-based data via communication with other devices outside of the vehicle. This information may include, for example, road grade, intersections, curvature, charging locations, construction, etc.

External dynamic information 206 may include information about conditions outside of the vehicle that change frequently over time. This information may be available from V2V and/or V2X communication. This information may include, for example, traffic density, weather forecast, traffic light phases, road conditions, and fuel or electricity price, among others. Operating commands 210 for one or more of vehicles 1-N may include commands to adjust vehicle performance by, e.g., tuning the performance of the forward and/or rearward vehicles. To control a dynamic response capability of a vehicle platoon so that, e.g., the vehicle platoon formation may be maintained over undulating terrain and/or routes where speeds are changing. For example, VPC may process information about characteristics, operation and/or performance of one or more of the vehicles to adjust or tune the power or performance characteristics of one or more of the vehicles in the cohort. Such processing may occur on-board one or more of the vehicles or at an off-board computing system in communication with one or more of the vehicles. VPC 200 may automatically adjust safety system trims based on a variety of changing conditions. An important consideration for the deployment of an autonomous vehicle platoon is having a capable safety system. However, the capability of the safety system may need to be dynamically adjustable for a human operator to provide help when necessary.

VPC 200 may be configured to perform one or more of the control processes disclosed herein. The disclosed processes may be implemented in connection with a number of vehicle platoons including vehicle platoons comprising a single forward vehicle and a single rearward vehicle, as well as vehicle platoons including a greater number of vehicles in which case, there may be multiple forward vehicles and/or multiple rearward vehicles relative to a given vehicle in a cohort. The disclosed processes may utilize parameters such as vehicle mass, vehicle losses such as power loss due to aerodynamic drag, power loss due to rolling resistance, and power loss due to powertrain losses. These parameters may be determined using system identification techniques such as vehicle parameter determination (VPD). Illustrative examples of VPD techniques are disclosed in U.S. Pat. No. 10,000,214, entitled Vehicle Controls Including Dynamic Vehicle Parameter Determination and issued Jun. 19, 2018, the disclosure of which is hereby incorporated by reference.

The disclosed processes may tune the vehicle performance of forward and rearward vehicles of a vehicle platoon based at least in part upon look-ahead route information and vehicle transient response capability information. Look-ahead route information may include road grade, traffic, weather, speed limit, and other information pertaining to the conditions over a look-ahead horizon for a vehicle platoon or a given vehicle in a vehicle platoon. Look-ahead route information may be determined by an electronic control system or component thereof in any of the manners of determining or determination disclosed herein.

Vehicle transient response capability information may include information indicative of a transient response capability of one or more forward vehicles of a vehicle platoon, e.g., acceleration capability, grade-climbing capability, and/or another vehicle performance capability of a forward vehicle. Vehicle transient capability may additionally or alternatively include information indicative of a transient response capability of one or more rearward vehicles of a vehicle platoon, e.g., acceleration capability, grade-climbing capability, and/or another vehicle performance capability of a rearward vehicle. A number of vehicle characteristics and route information may be used to determine vehicle capability information, e.g., engine torque curves or other limits imposed on engine torque or output, engine-wheel gear ratios, vehicle mass, vehicle losses such as aerodynamic, rolling, and powertrain losses, and road grade. Vehicle transient response capability information may be determined by an electronic control system or component thereof in any of the manners of determining or determination disclosed herein.

Figure 3:
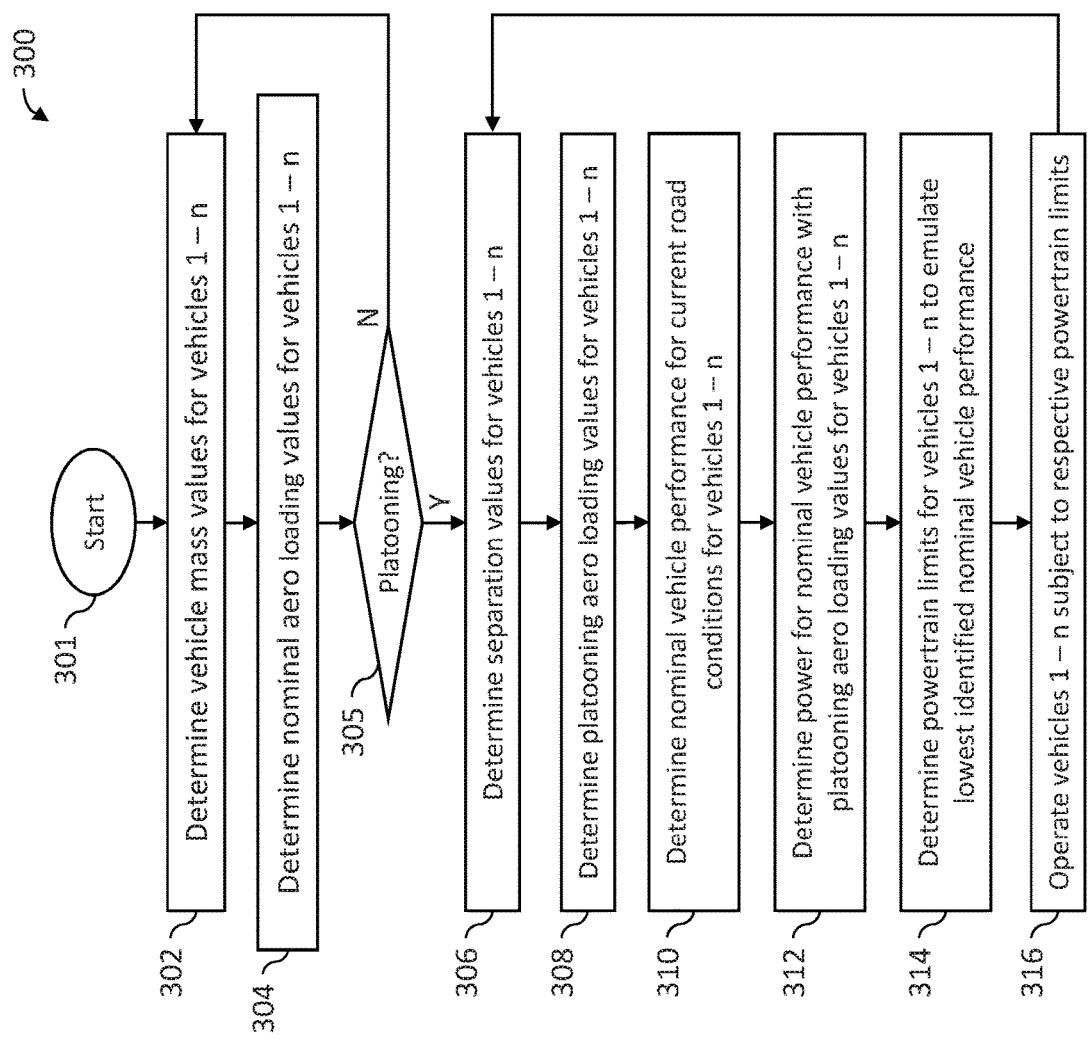
FIG. 3 is a flow diagram depicting certain aspects of an illustrative control process which may be utilized in controlling a vehicle platoon.

Vehicle transient response capability information or a forward vehicle and/or a rearward vehicle may be utilized in controlling vehicle platoon operation in a number of manners. For example, in case of a heavier forward vehicle, the performance of one or more rearward vehicles may be limited to match the performance capability of a forward vehicle. In case of a lighter forward vehicle, performance capability of one or more rearward vehicles may be enhanced to match the performance of the forward vehicle. At sufficiently closer distances aerodynamic losses may have a significant impact on a rearward vehicle due to its position relative to a forward vehicle. Vehicle performance may be tuned by dynamically changing engine torque curve limits and acceleration limits. A number of torque control or limiting features and/or acceleration control or limiting features may be modified to achieve desired platooning operation using dynamic control methods to achieve torque/power limiting. Dynamically modifying the vehicle separation may also be utilized to influence the aerodynamic loading of both the forward vehicle and the rearward vehicle thus impacting the aerodynamic drag coefficient (Cd) of both vehicles. Modifying the vehicle separation may include modifying vehicle separation distance or following distance, modifying vehicle lateral offset, modifying vehicle yaw, or combinations thereof. Additionally, modifying the vehicle separation may include such modification for a single vehicle of for multiple vehicles With reference to FIG. 3 there is illustrated a flow diagram depicting certain aspects of illustrative control process 300 which may be performed by a VPCS, for example, VPCS 100 described in connection with FIG. 1. It shall be appreciated that a number of aspects and forms of process 300 may be performed by an electronic control system of a single vehicle of a vehicle platoon or by electronic control systems of multiple vehicles of a vehicle platoon. On the other hand, some aspects and forms of process 300 may require operation of electronic control systems of multiple vehicles of a vehicle platoon. For illustrative purposes, process 300 may be described in terms of a first vehicle, which may be one of a forward vehicle and a rearward vehicle of a vehicle platoon, and a second vehicle which is the other of the forward vehicle and the rearward vehicle of the vehicle platoon. For example, the first vehicle described below may be a rearward vehicle of a vehicle platoon, and the second vehicle described below may be a forward vehicle which is forward of the rearward vehicle and which may be, although is not necessarily a lead vehicle. It shall be appreciated, however, that various aspects of process 300 may be instantiated in multiple control elements and may be in and performed by control elements of any number of vehicles of a vehicle platoon. For example, in certain forms, the electronic control systems of a plurality of vehicles in a vehicle platoon will each execute a control process according to process 300. It shall be further appreciated that the acts of determination and the acts of obtaining described in connection with process 300 may be performed by an electronic control system or component thereof in any of the manners of determining or determination disclosed herein.

Process 300 begins at start operation 301 and proceeds to operation 302 which determines vehicle mass values for a plurality of vehicles, for example, vehicles $1$-$n$ in a platoon of n vehicles. In certain forms, operation 302 may determine vehicle mass values using one or more system identification (system ID) techniques which, in general terms, characterize parameters of a system by measuring inputs and outputs during a plurality of system conditions. In certain forms, the vehicle mass values may be determined using VPD techniques in accordance with the disclosure of U.S. Pat. No. 10,000,214 referenced herein above. In certain forms, the vehicle mass values may be a predetermined value. In certain forms, the vehicle mass values may be a calibratable value. Further forms of operation 302 may use additional or alternate techniques to determine vehicle mass values for the plurality of vehicles including the techniques disclosed elsewhere herein as well as other techniques as will occur to one of skill in the art with the benefit of the present disclosure.

Process 300 proceeds from operation 302 to operation 304 which determines nominal (non-platooning) aerodynamic loading values for each the plurality of vehicles. In certain forms, operation 304 may determine nominal aerodynamic loading values using one or more system identification (system ID) techniques which, in general terms, characterize parameters of a system by measuring inputs and outputs during a plurality of system conditions. In certain forms, the nominal aerodynamic loading values may be determined using VPD techniques in accordance with the disclosure of U.S. Pat. No. 10,000,214 referenced herein above. In certain forms, nominal aerodynamic loading values may be a predetermined value. In certain forms, the nominal aerodynamic loading values may be a calibratable value. Further forms of operation 304 may use additional or alternate techniques to determine the nominal aerodynamic loading values for the plurality of vehicles including the techniques disclosed elsewhere herein as well as other techniques as will occur to one of skill in the art with the benefit of the present disclosure.

Process 300 proceeds from operation 304 to conditional 305 which evaluates whether the plurality of vehicles are in platooning configuration. In certain forms, operation 305 may determine whether the plurality of vehicles are in platooning configuration by evaluating a flag or other variable or data structure stored in a non-transitory memory of one or more controllers of a VPCS and/or communicated to a VPCS via one or more communication networks. Other forms of operation 305 may use additional or alternate techniques to determine the plurality of vehicles are in platooning configuration including the techniques disclosed elsewhere herein as well as other techniques as will occur to one of skill in the art with the benefit of the present disclosure. If conditional 305 evaluates that two or more vehicle systems are not in platooning configuration, process 300 proceeds to operation 302.

If conditional 305 evaluates that the plurality of vehicles are in platooning configuration, process 500 proceeds to operation 306 which determines separation values for the plurality of vehicles. In certain forms, operation 306 may determine separation values for the plurality of vehicles using radar systems, LIDAR systems, proximity sensor systems, camera systems, and combinations of these and/or other sensor systems. Other forms of operation 306 may use additional or alternate techniques to determine separation values for the plurality of vehicles including the techniques disclosed elsewhere herein as well as other techniques as will occur to one of skill in the art with the benefit of the present disclosure.

Process 300 proceeds from operation 306 to operation 308 which determines platooning aerodynamic loading values (e.g., the aerodynamic loading values for the vehicles while in a given platooning configuration). In certain forms, operation 308 determines platooning aerodynamic loading values by adjusting each of the nominal aerodynamic loading values for the plurality of vehicles using the vehicle separation distance. In certain forms, operation 308 may determine adjusted aerodynamic loading values by reducing or scaling respective nominal aerodynamic loading values using a drafting coefficient. The drafting coefficients may be determined using pre-configured control logic, such as a lookup table, configured to output a drafting coefficient value in response to a plurality of inputs including one inter-vehicle distance wither alone or in combination with one or more lateral offset between a lead vehicle and a following vehicle, leading vehicle yaw, following vehicle yaw, leading vehicle speed, following vehicle speed, ambient wind direction, and ambient wind speed. The lookup table or other control logic may be configured by empirical determination, determined using model-based calculations, or determined using a combination of both techniques. Operation 308 may further aggregate or sum the adjusted aerodynamic loading values to determine a platoon net adjusted aerodynamic loading value. Other forms of operation 308 may use additional or alternate techniques to determine platooning aerodynamic loading values for the plurality of vehicles including the techniques disclosed elsewhere herein as well as other techniques as will occur to one of skill in the art with the benefit of the present disclosure.

Process 300 proceeds from operation 308 to operation 310 which determines a nominal (non-platooning) vehicle performance capability for current road conditions for each of the plurality of vehicles in the platoon. In certain forms, operation 310 may use a power balance equation to determine baseline vehicle (non-platooning) performance on current road conditions. Other forms of operation 310 may use additional or alternate techniques to determine nominal vehicle performance for current road conditions for the plurality of vehicles including the techniques disclosed elsewhere herein as well as other techniques as will occur to one of skill in the art with the benefit of the present disclosure.

Process 300 proceeds from operation 310 to operation 312 which determines the power required to provide nominal vehicle performance under a given platooning configuration and current road conditions. Other forms of operation 310 may use additional or alternate techniques to determine power required to provide nominal vehicle performance.

Process 300 proceeds from operation 312 to operation 314 which determines powertrain limits for each of the plurality of vehicles to emulate the lowest non-platooning transient response capability among the plurality of vehicles of the platoon. Other forms of operation 314 may use additional or alternate techniques to determine powertrain limits for each of the plurality of vehicles to emulate the lowest non-platooning transient response capability among the plurality of vehicles of the platoon. As described above, the non-platooning transient response capability may be, for example, an acceleration capability, a grade-climbing capability, and/or another vehicle performance capability of a vehicle of a platoon.

Process 300 proceeds from operation 314 to operation 316 which operates each of the plurality of vehicles subject to its respective powertrain limit to provide operation of each of the vehicles of the platoon emulating the lowest non-platooning transient response capability among the plurality of vehicles of the platoon.

As described above, process 300 is one example of a process implementable and executable in an electronic control system to identify the nominal aerodynamic loading of a vehicle when it is operating alone (not in a platoon). The aerodynamic loading and powertrain capabilities of the vehicle will result in limits on the transient response of the single vehicle. As the vehicle becomes part of a platoon, it will have improved transient capabilities due to the reduced aerodynamic loading on the vehicle i.e. there will be more torque/power available for acceleration, grade climbing ability, and other transient operations. The power output from the powertrain may be artificially limited so that the transient characteristics of the vehicle in the platoon is limited to that of the same vehicle on its own. This reduced power output will result in increased fuel economy and the vehicle in the platoon will accelerate as though it is still on its own. As such the vehicle will see fuel consumption reductions from both the mechanical aero load reductions due to being in a platoon, but will also see fuel consumption reduction due to the lower loads on the powertrain from the transients. The reduced transients when operating within a platoon much be set to match that of the weakest link in the platoon so as to be able to maintain platoon formation. Thus the platoon will perform no worse than the least capable vehicle would have done on its own.

Figure 4:
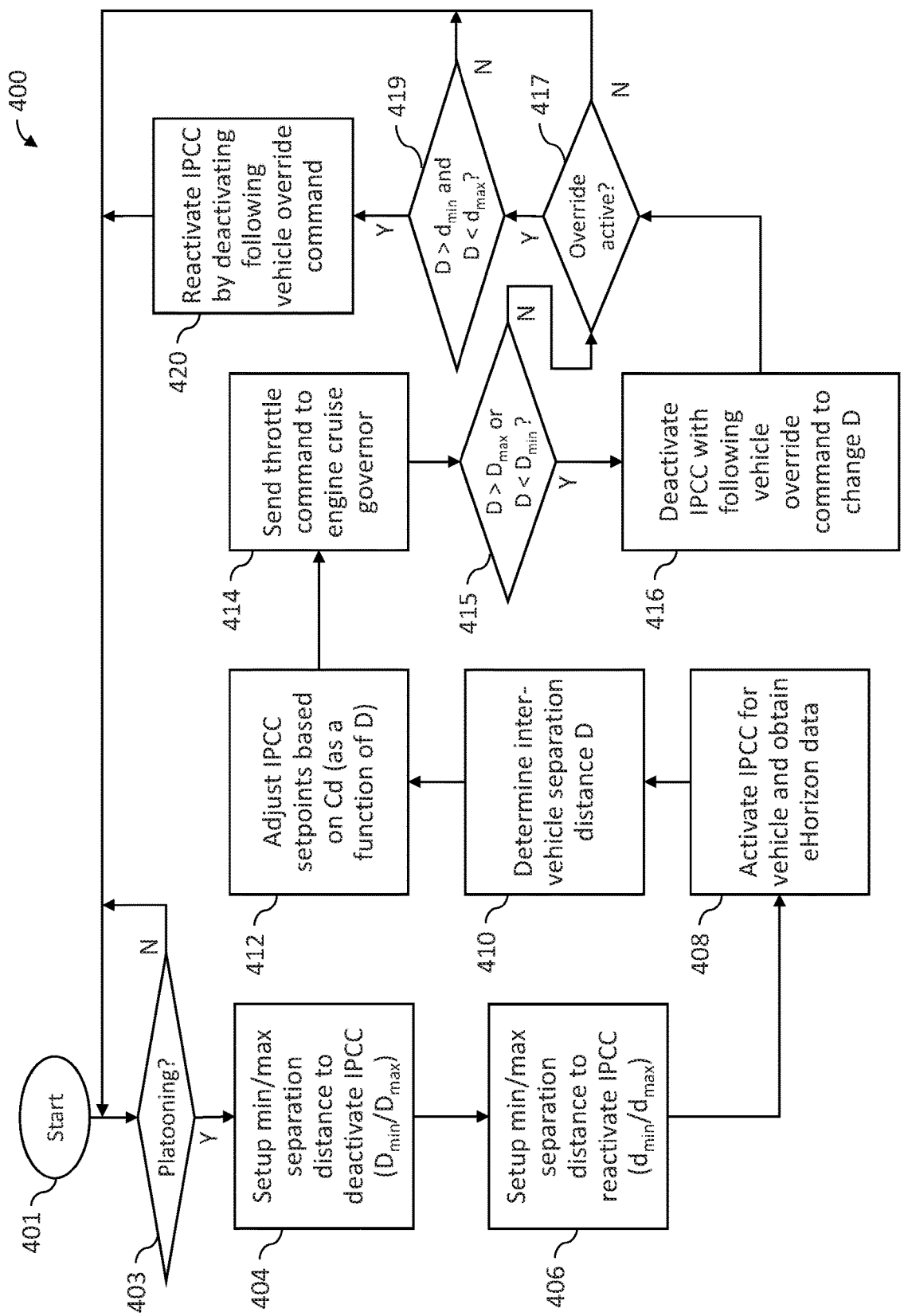
FIG. 4 is a flow diagram depicting certain aspects of an illustrative control process which may be utilized in controlling a vehicle platoon.

With reference to FIG. 4, there is illustrated a flow diagram depicting certain aspects of an illustrative process 400 which can be performed by a vehicle platoon control system such as VPCS 100 described above in connection with FIG. 1. Process 400 may be performed while a vehicle platoon, such as vehicle platoon 103 described above in connection with FIG. 1, is operating in a platooning mode with the constituent vehicles of the platoon concurrently performing an individualized predictive cruise control (IPCC) processes. Process 400 is one illustrative examiner of a supervisory process for a vehicle platoon with two or more vehicles executing IPCC processes which may be referred to as a supervised IPCC process. In certain examples, a supervised IPCC process each individual vehicle in a platoon performs respective predictive cruise control operations without regard to the control decisions of the other vehicles in the platoon, but is supervised via the use of active overrides of the engine throttle commands to achieve vehicle collision mitigation. For example, in the context of VPCS 100, VECS 104a of vehicle 101a and VECS 104b of vehicle 101b may be configured to individually execute a predictive cruise control process which automatically adjusts vehicle speed and following distance in response to environmental and operational information pertaining to each vehicle individually.

The environmental and operational information utilized by the IPCC processes disclosed herein may include look-ahead route information such as road grade information, vehicle motion constraint information such as information indicative of traffic, weather, speed limit or other regulatory limit information, geo-fencing and other information pertaining to the conditions over a look-ahead horizon for a vehicle platoon or a given vehicle in a vehicle platoon. These and other environmental and operational information may be obtained via any of the communication techniques disclosed herein. Further details of illustrative predictive cruise control processes may be of such as the processes disclosed in U.S. application Ser. No. 15/342,948 entitled "Systems and methods for idle coasting management of a vehicle having predictive cruise control" and/or International Application No. PCT/US2018/014758 entitled "Systems and methods for predictive gear shifting and integrated predictive cruise control" the disclosures of which are hereby incorporated by reference.

Process 400 is initiated at start operation 401 and proceeds to conditional 403 which evaluates whether two or more vehicles are operating in a platooning mode. If conditional 403 evaluates negative, conditional 403 repeats its evaluation at a future time. If conditional 403 evaluates affirmative, process 400 proceeds to operation 404.

Operation 404 establishes a minimum separation distance ($D_{min}$) and a maximum separation distance ($D_{max}$) outside which process 400 will deactivate IPCC operation. Operation 404 may establish $D_{min}$ and $D_{max}$ in a number of manners. In certain forms, $D_{min}$ and $D_{max}$ may be predetermined, for example, by setting calibratable values in an electronic control system. In certain forms, $D_{min}$ and $D_{max}$ may be dynamically determined in response to environmental and operational information of a vehicle system. From operation 404, process 400 proceeds to operation 406.

Operation 406 establishes a minimum separation distance ($d_{min}$) and a maximum separation distance ($d_{max}$) at which process 400 will reactivate IPCC operation. Operation 406 may establish $d_{min}$ and $d_{max}$ in a number of manners. In certain forms, $d_{min}$ and $d_{max}$ may be predetermined, for example, by setting calibratable values in an electronic control system. In certain forms, $d_{min}$ and $d_{max}$ may be dynamically determined in response to environmental and operational information of a vehicle system. From operation 406, process 400 proceeds to operation 408.

Operation 408 activates IPCC operation for a vehicle and obtains e-Horizon data. From operation 408, process 400 proceeds to operation 410. Operation 410 determines a current inter-vehicle separation distance ($D_i$), for example, using input from a proximity sensor, radar, LIDAR, camera, or other sensors. From operation 410, process 400 proceeds to operation 412 which determines the current (e.g., instantaneous, or averaged over a sample interval) coefficient of aerodynamic drag (Cd) as a function of current inter-vehicle separation distance (D). This determination may be made, for example, based on model or computation that determines variance from a nominal aerodynamic drag based upon drafting effects of D as well as other variables such as air pressure, temperature, wind speed, wind direction, and other variables impacting aerodynamic drag. Operation 412 then and adjusts one an IPCC setpoint based on Cd. The adjusted IPPC setpoint may be determined by determining a vehicle separation distance that provides an optimized or desired drafting benefit (reduced Cd), determining a vehicle acceleration needed to achieve the optimized or desired separation distance, and selecting an IPCC setpoint to achieve the vehicle separation distance. The adjusted IPCC setpoint may be determined for a future vehicle mission segment using look-ahead information, such as e-Horizon information, to perform the foregoing operations over a look-ahead operating window. From operation 412, process 400 proceeds to operation 414 which sends a throttle command to the engine cruise governor in response to the adjusted IPCC setpoints.

From operation 414, process 400 proceeds to conditional 415, which evaluates whether $D>D_{max}$ or $D<D_{min}$. If neither condition is true, process 400 proceeds to conditional 417. If either condition is true, process 400 proceeds to operation 416 which deactivates IPCC using a following vehicle override command. The following vehicle override command is preferably configured and structured in a manner analogous to the commands utilized by a vehicle electronic control system to vary prime mover output in response to operator input from an accelerator pedal, input from a cruise control system, or input from any of various governors which operate to influence prime mover or powertrain operation, for example, an engine throttle command, a torque command, or any of other control variables as would occur to one of ordinary skill in the art with the benefit of the present disclosure. The following vehicle override command may be provided via control path P7 illustrated and described below in connection with FIG. 8, or in another suitable control path.

From operation 416, process 400 proceeds to conditional 417. Conditional 417 evaluates whether the following vehicle override command is active. If conditional 417 evaluates that the following vehicle override command is not active, process 400 proceeds to conditional 403. If conditional 417 evaluates that the following vehicle override command is active, process 400 proceeds to conditional 419. Conditional 419 evaluates whether $D>d_{min}$ and $D<d_{max}$. If either condition is false, process 400 proceeds to conditional 403. If both conditions are true, process 400 proceeds to operation 420 which reactivates IPCC by ending the following vehicle override command.

In an illustrative operational scenario, process 400 may be implemented in and executed wither in part or entirely by an electronic control system of a following vehicle in a vehicle platoon, for example, VECS 104b of vehicle 101b of vehicle platoon 103 described above in connection with FIG. 1. It shall be appreciated that other instances of process 400 may be concurrently operated in other vehicles in a vehicle platoon. The VECS executing process 400 may have PCC enabled using the onboard e-Horizon system and may be ignorant of the engine throttle and other control commands of other vehicles in the platoon. In certain forms, real-time information on separation distance is fed to each PCC controller to determine the instantaneous aerodynamic drag ($Cd_i$) of the vehicle. The $Cd_i$ of the vehicle may be used by the IPCC controls to determine any forward horizon cruise speed plan to minimize fuel consumption. As the vehicles conduct their velocity changes, the inter-vehicle separation distance is monitored. If this separation distance is to exceed certain min/max limits set by the super-system controller, then a PCC override will be created for the following vehicle. This override will either increase or decrease the engine output torque so as to decrease or increase (respectively) the separation distance. Once the inter-vehicle separation distance gets within the min/max threshold then the individual vehicles return back to individual PCC control.

In a further illustrative operational scenario, process 400 may be implemented in and executed wither in part or entirely by an electronic control system of a leading vehicle in a vehicle platoon, for example, VECS 104a of vehicle 101a of vehicle platoon 103 described above in connection with FIG. 1. In this scenario, use of the vehicle override command may be limited to only commands providing vehicle deceleration and not acceleration.

The vehicle override command commands may be determined by using a number of input parameters including, for example, upcoming terrain load on a lead vehicle, upcoming terrain load on following vehicle, current acceleration rate of lead vehicle, current acceleration rate of following vehicle, current torque margin (increase or decrease) for a lead vehicle, current torque margin (increase or decrease) for a following vehicle, current acceleration/deceleration capability of a lead vehicle without use of vehicle foundation brakes, and/or current acceleration/deceleration capability of a lead vehicle without use of vehicle foundation brakes. In response to these inputs, a VECS may perform an optimization using VPD techniques to assess the options and determine the least fuel consuming option to converge the distance constrained by a calibration distance (which may be a function of the average grade and grade variation experienced in the past 1 mile—or other appropriate distance). By using the forward data and these equations, an assessment on engine load can be made. The input factors here are then used to determine the ideal setpoints for the override commands.

In one example, the override commands may be determined using first-order vehicle power dynamics which may be modeled in accordance with equation (1).

$$P_{Propulsion} = P_{Aero} + P_{Whl\ drag} + P_{Gravity} + P_{Acct} + P_{Loss} \quad (1)$$

The power required to overcome aerodynamic drag ($P_{aero}$) may then be modeled in accordance with equation (2).

$$P_{aero} = \frac{1}{2} C_d A \rho U^3 \quad (2)$$

In equation (2) $C_d$ is the coefficient of aerodynamic drag, A is the aerodynamic drag area, $\rho$ is air density, and U is vehicle velocity.

Figure 5:
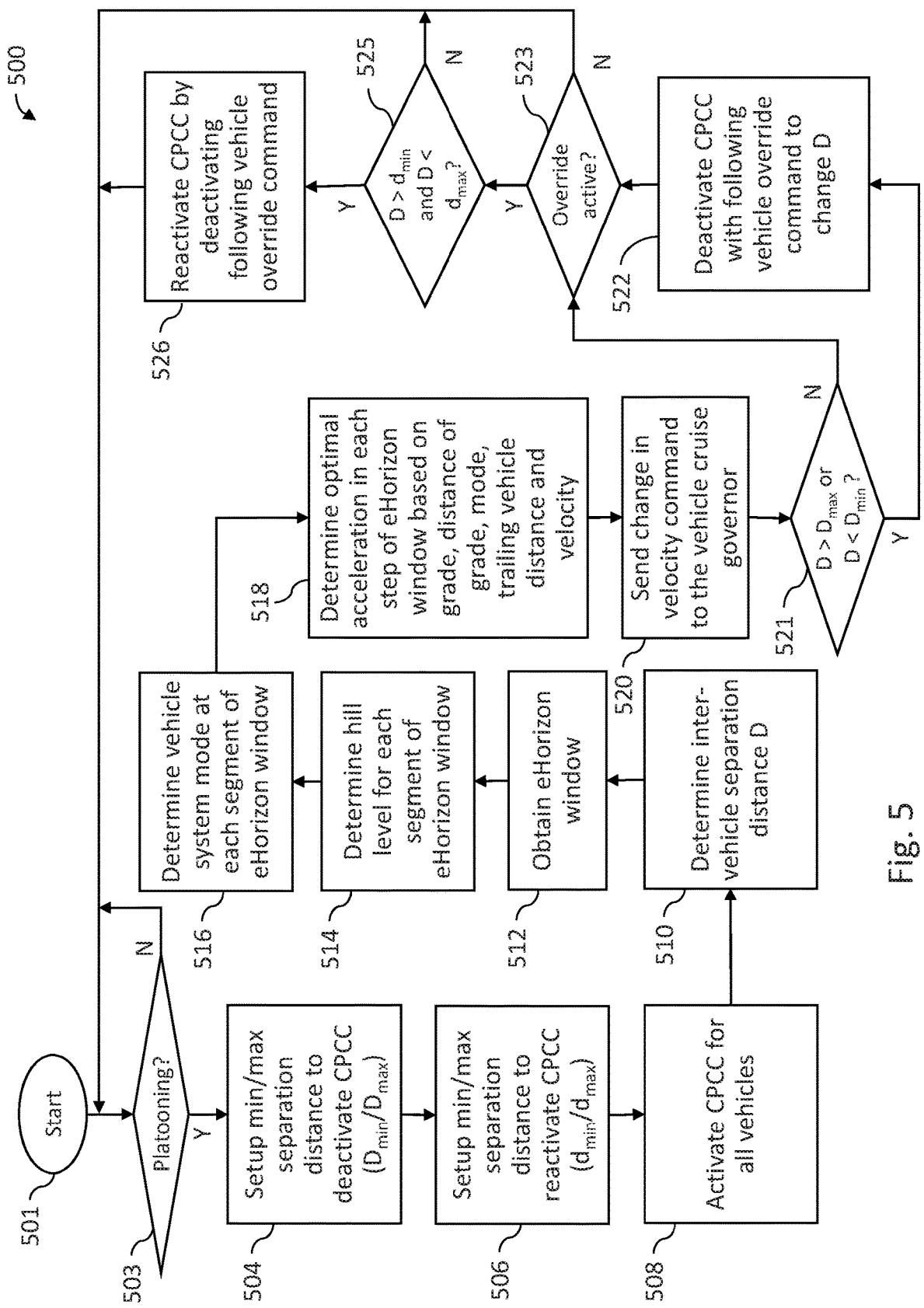
FIG. 5 is a flow diagram depicting certain aspects of an illustrative control process which may be utilized in controlling a vehicle platoon.

With reference to FIG. 5, there is illustrated a flow diagram depicting certain aspects of an illustrative process 500 which can be performed by a vehicle platoon control system such as VPCS 100 described above in connection with FIG. 1. Process 500 may be performed while a vehicle platoon, such as vehicle platoon 103 described above in connection with FIG. 1, is operating in a platooning mode with the constituent vehicles of the platoon under control of a common predictive cruise control (CPCC) processes. Process 500 is one illustrative examiner of a supervisory process for a vehicle platoon with two or more vehicles executing CPCC processes which may be referred to as a supervised CPCC process. In certain examples, a supervised CPCC process determines predictive cruise control setpoints for each vehicle in a platoon with knowledge and command authority over the PCC control decisions of the other vehicles in the platoon and, additionally, is supervised via the use of active overrides of the CPCC commands to achieve vehicle collision mitigation. For example, in the context of VPCS 100, one or more of control system 140, VECS 104a of vehicle 101a and VECS 104b of vehicle 101b may be configured to execute a predictive cruise control process which automatically adjusts speed and following distance for all vehicles in platoon 103 in response to environmental and operational information to each vehicle individually.

The environmental and operational information utilized by the CPCC processes disclosed herein may include look-ahead route information such as road grade information, vehicle motion constraint information such as information indicative of traffic, weather, speed limit or other regulatory limit information, geo-fencing and other information pertaining to the conditions over a look-ahead horizon for a vehicle platoon or a given vehicle in a vehicle platoon. These and other environmental and operational information may be obtained via any of the communication techniques disclosed herein. Further details of illustrative predictive cruise control processes are disclosed in U.S. application Ser. No. 15/342,948 entitled "Systems and methods for idle coasting management of a vehicle having predictive cruise control" and/or International Application No. PCT/US2018/014758 entitled "Systems and methods for predictive gear shifting and integrated predictive cruise control" the disclosures of which are hereby incorporated by reference.

Process 500 is initiated at start operation 501 and proceeds to conditional 503 which evaluates whether two or more vehicles are operating in a platooning mode. If conditional 503 evaluates negative, conditional 503 repeats its evaluation at a future time. If conditional 503 evaluates affirmative, process 500 proceeds to operation 504 which establishes a minimum separation distance ($D_{min}$) and a maximum separation distance ($D_{max}$) outside which process 500 will deactivate CPCC operation. Operation 504 may establish $D_{min}$ and $D_{max}$ in a number of manners. In certain forms, $D_{min}$ and $D_{max}$ may be predetermined, for example, by setting calibratable values in an electronic control system. In certain forms, $D_{min}$ and $D_{max}$ may be dynamically determined in response to environmental and operational information of a vehicle system. From operation 504, process 500 proceeds to operation 506.

Operation 506 establishes a minimum separation distance ($d_{min}$) and a maximum separation distance ($d_{max}$) at which process 500 will reactivate CPCC operation. Operation 506 may establish $d_{min}$ and $d_{max}$ in a number of manners. In certain forms, $d_{min}$ and $d_{max}$ may be predetermined, for example, by setting calibratable values in an electronic control system. In certain forms, $d_{min}$ and $d_{max}$ may be dynamically determined in response to environmental and operational information of a vehicle system. From operation 506, process 500 proceeds to operation 508.

Operation 508 activates CPCC operation for all vehicles in the platoon. From operation 508, process 500 proceeds to operation 510 which determines a current inter-vehicle separation distance (D). From operation 510, process 500 proceeds to operation 512 which obtains e-Horizon information over a look-ahead window. From operation 512, process 500 proceeds to operation 514 which determines a hill level for each segment of the e-Horizon window. From operation 514, process 500 proceeds to operation 518 which determines optimal vehicle acceleration values in each step of the e-Horizon window based on road grade, distance of road grade, operating mode, trailing vehicle distance, and vehicle velocity. From operation 518, process 500 proceeds to operation 520 which sends a velocity change or acceleration command to the vehicle cruise control governor. Techniques similar to those described above in connection with FIG. 4 may be utilized for these determinations, except that they are performed for each vehicle in a platoon with knowledge of the control commands for all vehicles in the platoon. From operation 520, process 500 proceeds to conditional 521.

Conditional 521 performs evaluates whether $D > D_{max}$ or $D < D_{min}$. If neither condition is true, process 500 proceeds to conditional 517. If either condition is true, process 500 proceeds to operation 522 which deactivates CPCC using a following vehicle override command. The following vehicle override command is preferably configured and structured in a manner analogous to the commands utilized by a vehicle electronic control system to vary prime mover output in response to operator input from an accelerator pedal, input from a cruise control system, or input from any of various governors which operate to influence prime mover or powertrain operation, for example, an engine throttle command, a torque command, or any of other control variables as would occur to one of ordinary skill in the art with the benefit of the present disclosure. The following vehicle override command may be provided via control path P7 illustrated and described below in connection with FIG. 8, or in another suitable control path.

From operation 522, process 500 proceeds to conditional 523 which evaluates whether the following vehicle override command is active. If conditional 523 evaluates that the following vehicle override command is not active, process 500 proceeds to conditional 503. If conditional 523 evaluates that the following vehicle override command is active, process 500 proceeds to conditional which evaluates whether $D > d_{min}$ and $D < d_{max}$. If either condition is false, process 500 proceeds to conditional 503. If both conditions are true, process 500 proceeds to operation 526 which reactivates CPCC by ending the following vehicle override command.

In an illustrative operational scenario, process 500 may be implemented in and executed wither in part or entirely by an electronic control system of a lead vehicle in a vehicle platoon, for example, VECS 104a of vehicle 101a of vehicle platoon 103 described above in connection with FIG. 1. It shall be appreciated that other instances of process 500 may be concurrently operated in other vehicles in a vehicle platoon. The vehicle override command commands may be determined by using a number of input parameters including, for example, upcoming terrain load on a lead vehicle, upcoming terrain load on following vehicle, current acceleration rate of lead vehicle, current acceleration rate of following vehicle, current torque margin (increase or decrease) for a lead vehicle, current torque margin (increase or decrease) for a following vehicle, current acceleration/deceleration capability of a lead vehicle without use of vehicle foundation brakes, and/or current acceleration/deceleration capability of a lead vehicle without use of vehicle foundation brakes. In response to these inputs, a VECS may perform an optimization using VPD techniques to assess the options and determine the least fuel consuming option to converge the distance constrained by a calibration distance (which may be a function of the average grade and grade variation experienced in the past 1 mile—or other appropriate distance). By using the forward data and these equations, an assessment on engine load can be made. The input factors here are then used to determine the ideal setpoints for the override commands. In one example, the override commands may be determined using first-order vehicle power dynamics which may be modeled in accordance with equations (1) and (2) above.

Figure 6:
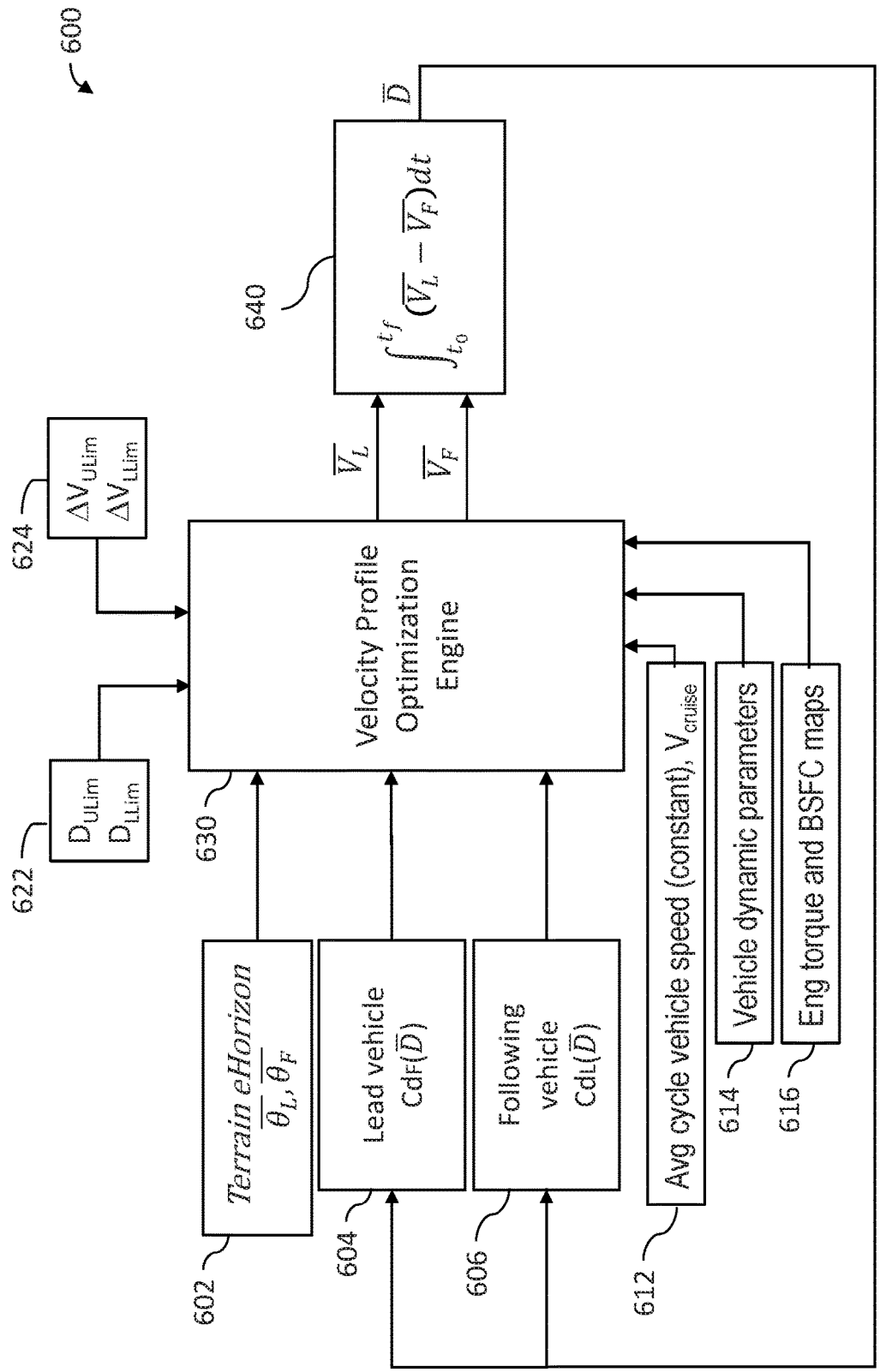
FIG. 6 is a block diagram depicting certain aspects of illustrative control logic which may be utilized in controlling a vehicle platoon.

With reference to FIG. 6, there is illustrated a block diagram depicting certain aspects of vehicle platoon control logic 600. Control logic 600 is one example of control logic which may be utilized to determine an optimized vehicle following distance $\overline{D}$. Control logic 600 includes a velocity profile optimization engine 630 which is configured to determine a velocity profile for each vehicle such that platoon fuel consumption is minimized. Velocity profile optimization engine 630 receives as inputs terrain e-Horizon information 602, a coefficient of aerodynamic drag for a lead vehicle as a function of vehicle separation distance ($Cd_F(\overline{D})$), a coefficient of aerodynamic drag for a following vehicle as a function of vehicle separation distance ($Cd_L(\overline{D})$), the average cycle vehicle speed and vehicle cruise velocity 612, vehicle dynamic parameters 614, engine torque and brake specific fuel consumption (BSFC) maps 616, upper and lower limits on vehicle separation ($D_{ULim}$ and $D_{LLim}$) 622, and upper and lower limits on vehicle acceleration ($DV_{ULim}$ and $DV_{LLim}$) 624. In response to these inputs, Velocity profile optimization engine 630 is configured to determine a solution to a multi-dimensional optimization problem. This determination can be made using a number of techniques including, for example, dynamic programming or dynamic optimization techniques, Pontryagin's maximum principle, convex optimization techniques, machine learning techniques, neural network or combinations of these and other optimization techniques as would occur to one of skill in the art with the benefit of the present disclosure. Velocity profile optimization engine 630 determines outputs a lead vehicle optimized velocity ($\overline{V}_L$) and a following vehicle optimized velocity ($\overline{V}_F$) which are provided to integration operator 460. Integration operator 640 determines a solution to an integral problem $$\left( \int_{t_0}^{t_f} (\overline{V}_L - \overline{V}_F) dt \right)$$

to outputs an optimized vehicle following distance $\overline{D}$.

Figure 7:
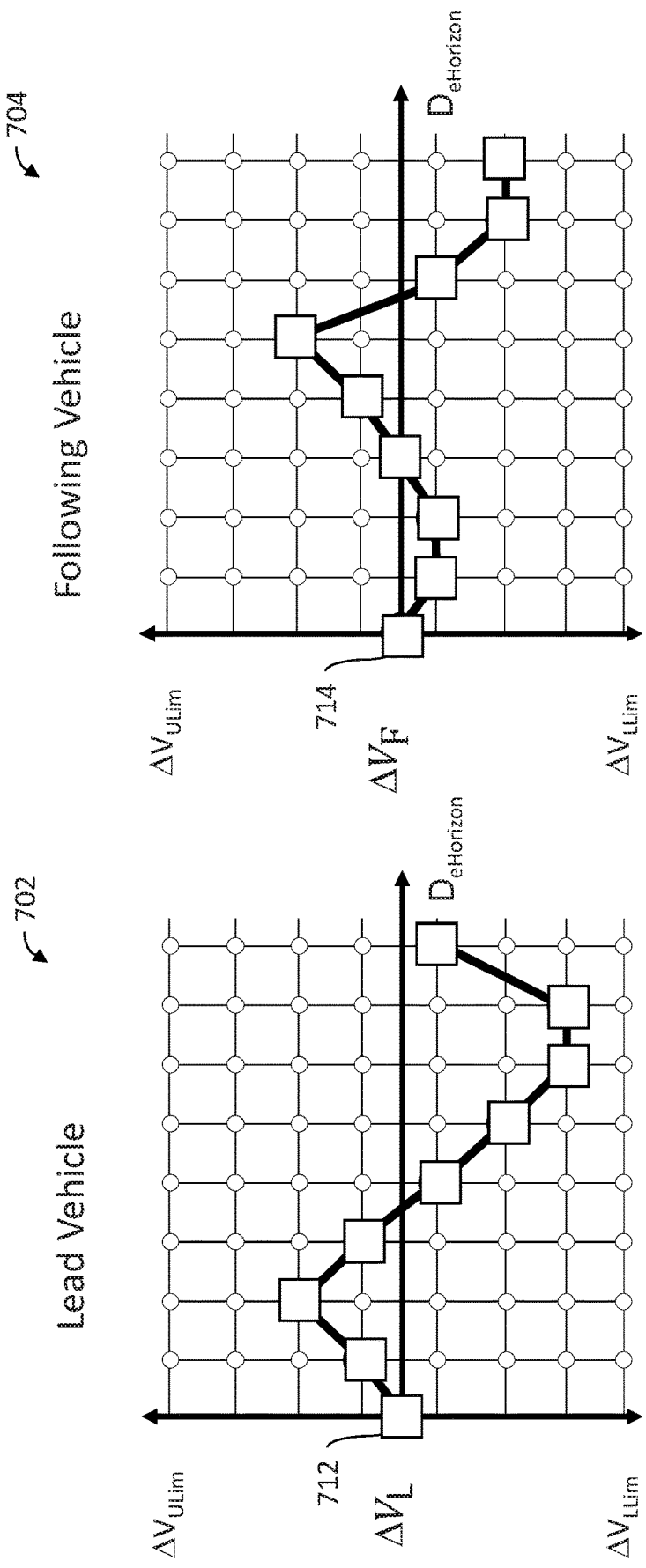
FIG. 7 is a set of graphs conceptually illustrating an optimization process which may be utilized in controlling a vehicle platoon.

With reference to FIG. 7 there are illustrated graphs 702 and 704 conceptually illustrating an optimization process which can be executed using control logic 600 or other optimization control logic. In this example, the lead vehicle and the following vehicle are assumed to have the same Vcruise target, for example, the following vehicle(s) may have their cruise target speed set via control path P7 illustrated and described below in connection with FIG. 8, or in another suitable control path. In this example, each vehicle has the same forward horizon of 100 m. This assumes a platoon of up to 10 vehicles with a 40 ft separation distance use where, with an e-Horizon step resolution of 100 m, it is reasonable to use a single forward view for all the vehicles. For refined operations, each vehicle may have its own unique forward view. The response of trailing vehicles(s) may also be filtered to account for the delay. The circular nodes of graphs 702 and 704 denote each discrete option of separation distance (D) at each step along the e-Horizon. An optimized solution may be determined by searching this space subject to upper and lower velocity limits ($V_{ULim}$ and $V_{LLim}$) and also subject to upper and lower vehicle separation change limits ($\Delta D_{ULim}$ and $\Delta D_{LLim}$). The solution paths 712 and 714 illustrate the change in velocity for the lead vehicle and following vehicle, respectively over the search space. It shall be appreciated that the average vehicle speeds are still targeting $V_{cruise}$ over the mission.

Figure 8:
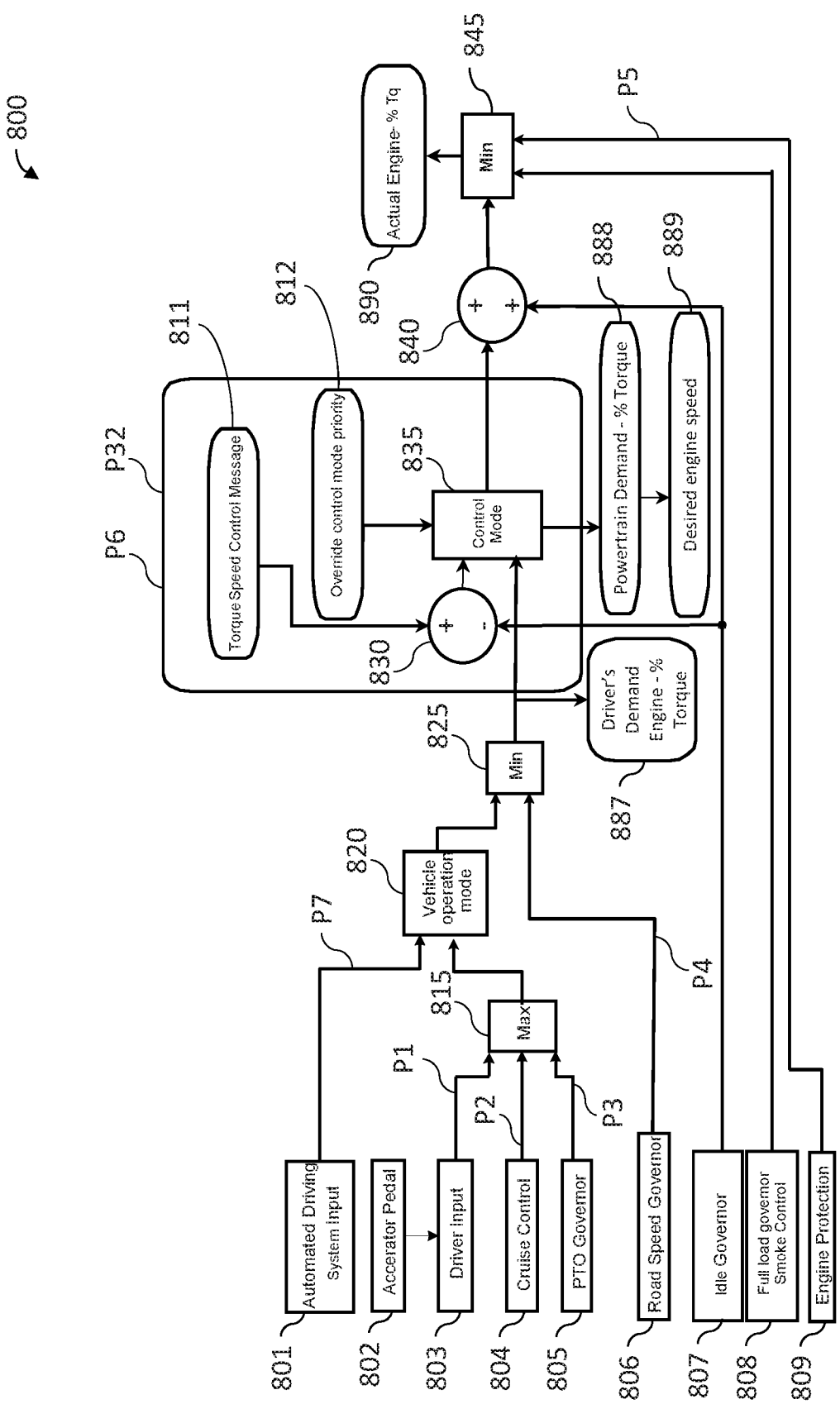
FIG. 8 is a block diagram depicting certain aspects of illustrative control logic which may be utilized in controlling a vehicle platoon.

With reference to FIG. 8, there is illustrated a block diagram depicting certain aspects of control logic 800 which may be implemented in one or more components of a vehicle electronic control system. Inputs 801-809 are an illustrative set of inputs that may be provided to influence powertrain output and vehicle speed and include automated driving system input 801, driver input 803 which is responsive to accelerator pedal input 802, cruise control input 804, PTO governor input 805, road speed governor input 806, idle governor 807 (which includes for frictional losses), full load smoke control governor 808, an engine protection limit 809. Control logic 800 further includes maximum value selection logic 815, vehicle operation mode logic 820, minimum value selection logic 825, comparator 830, control mode logic 835, and minimum value selection logic 845 which configured to determine and provide as the outputs driver engine demand % torque 887, powertrain demand % torque 888, engine desired operating speed 889, and actual engine % torque 890. Control logic 800 also includes torque speed control message input 811 and override control mode priority input 812. Control logic 800 is an illustrative implementation of engine control logic which includes a number of control pathways. In the illustrated form, the control pathways include accelerator pedal/operator input pathway P1, cruise control pathway P2, PT governor pathway P3, road speed governor pathway P4, engine protection pathway P5, transient torque limit pathway P6, automated driving system pathway P7, and temporary powertrain control pathway P32.

Figure 9:
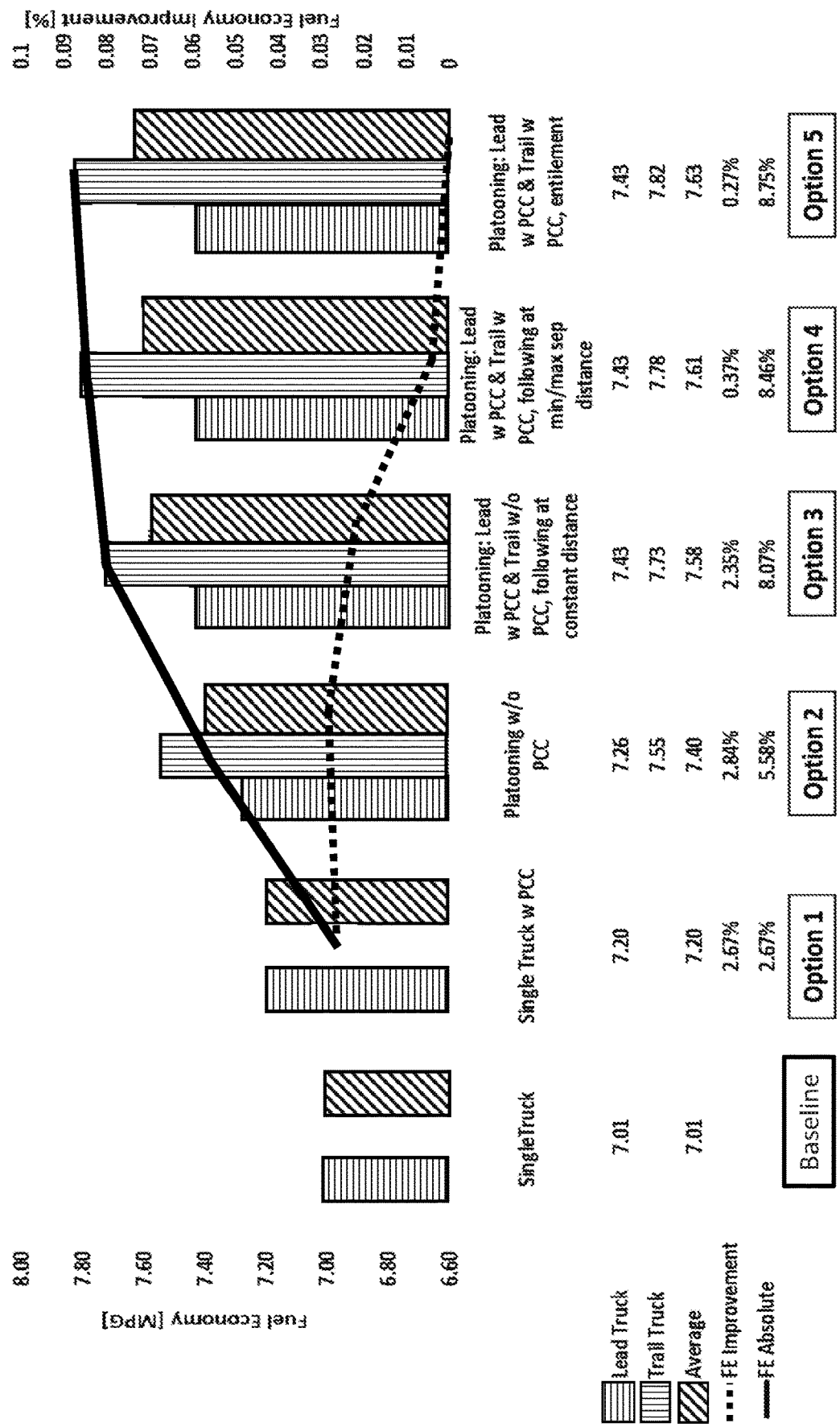
FIG. 9 is a graph illustrating variation in fuel economy for several vehicle operating modalities.
Figure 14:
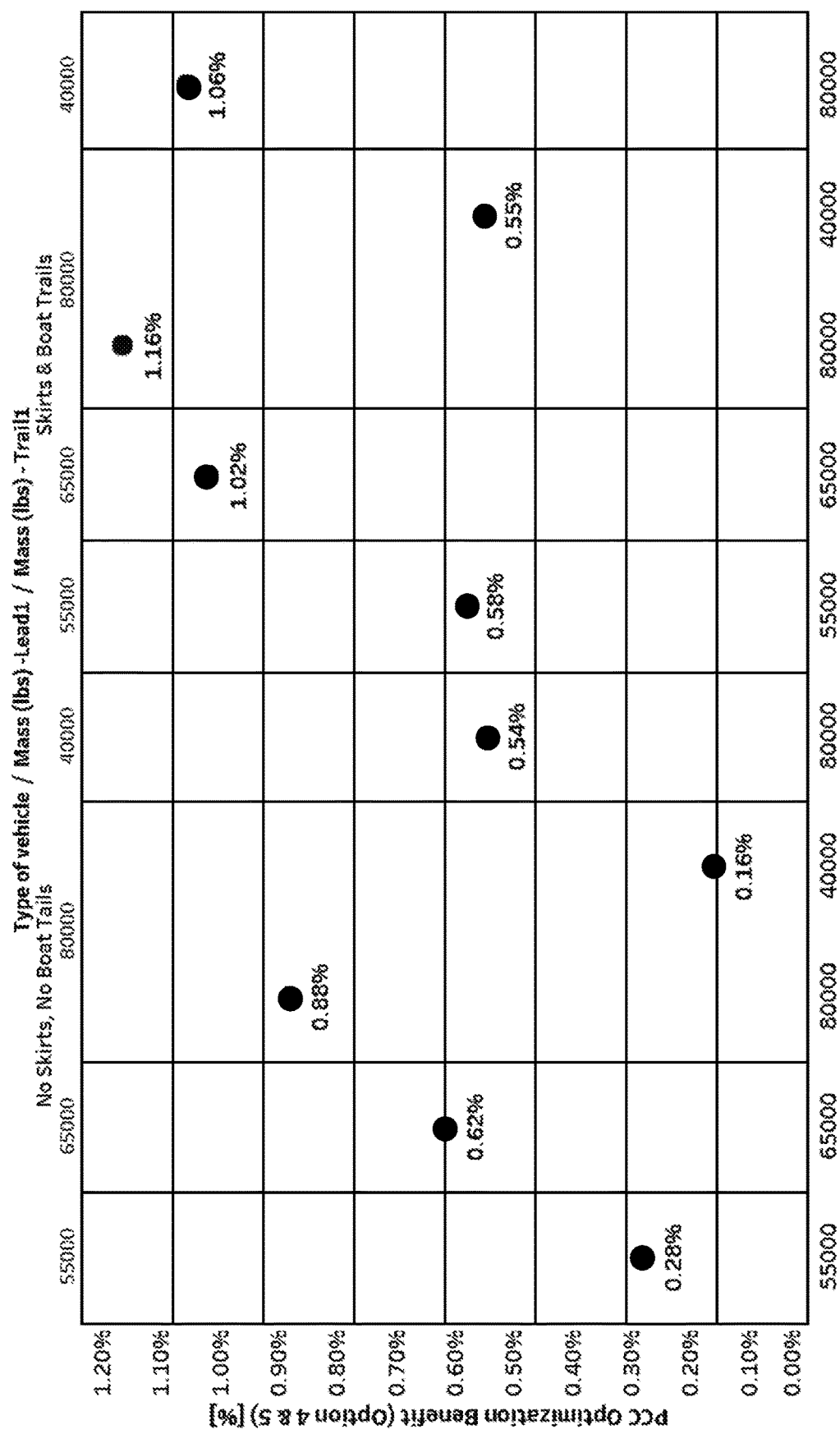
FIG. 14 is a graph illustrating variation in fuel economy for several vehicle operating modalities.

FIG. 9 is a graph illustrating variation in fuel economy for several vehicle operating modalities, namely, Options 1-5. Option 1 is a single vehicle with predictive cruise control ("PCC") operation. Option 2 is a platoon of vehicles with fixed speed cruise control and a fixed separation distance. Option 3 is a platoon of vehicles with lead-vehicle PCC and a fixed separation distance. Option 4 is a platoon of vehicles with lead-vehicle IPCC, following vehicle IPCC, and variable separation distance limited by minimum and maximum separation distances. Option 5 is a platoon of vehicles with lead-vehicle and following vehicle CPCC, and variable separation distance limited by minimum and maximum separation distances. As illustrated in FIG. 9, an additional 2.35% fuel economy can be achieved with just optimizing the lead truck with PCC (i.e., the fuel economy difference between Option 2-Option 3), and an additional 0.65% fuel economy can be realized with CPCC (i.e., fuel economy difference between Option 3-Option 5). FIGS. 10-13 are tables illustrating variation in fuel economy for Options 1-5. FIG. 14 is a graph illustrating variation in fuel economy for several Options 3, 4, and 5. As illustrated a fuel economy benefit over and above Option 3 is provided by using either Option 4 or 5.

Figure 15:
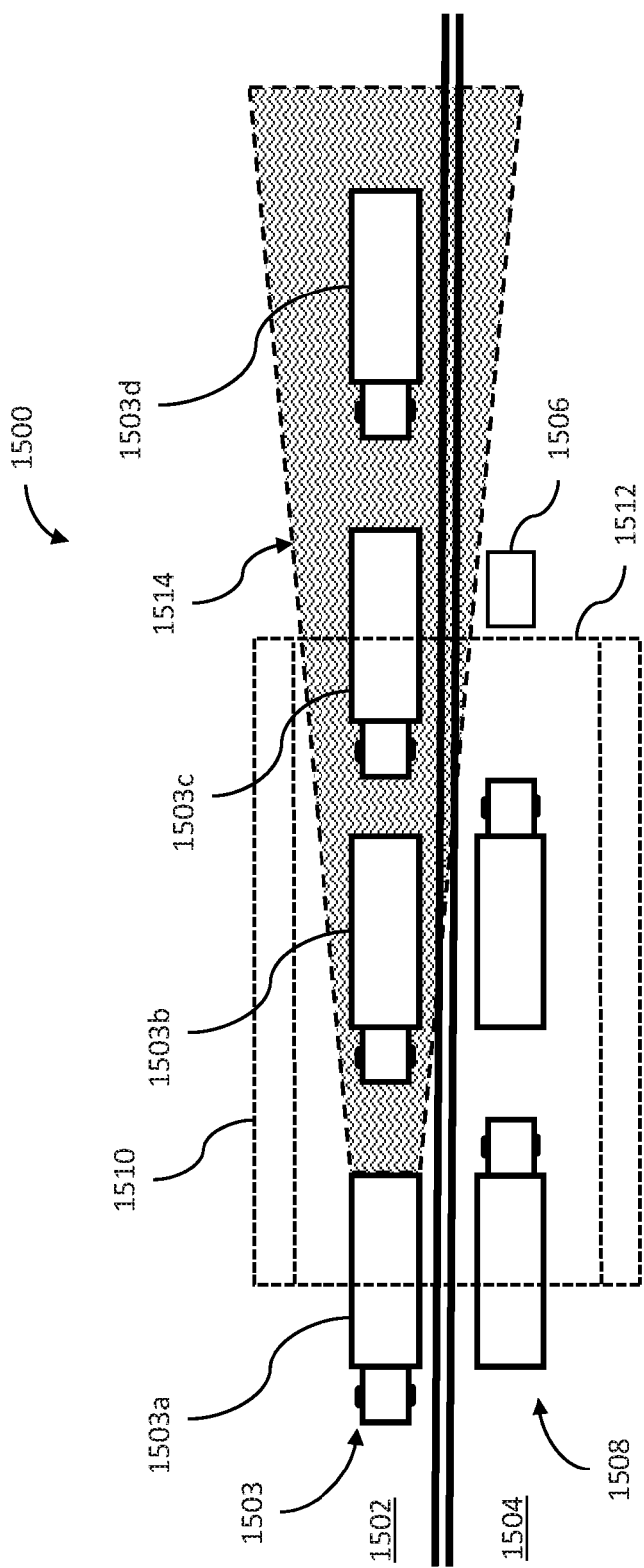
FIG. 15 is a schematic diagram illustrating an example vehicle platoon and neighboring vehicles and/or environmental elements.

FIG. 15 illustrates a schematic of a route 1500 including a vehicle platoon or cohort 1503 in a first lane 1502 along a portion of the route 1500 vehicle platoon or cohort 1503 includes a plurality of vehicles 1503a, 1503b, 1503c, 1503d, however other embodiments contemplate vehicle platoons or cohorts comprising different numbers of vehicles. A second lane 1504 of the route 1500 includes a second vehicle 1506 and/or a second platoon 1508 traveling in the direction opposite of the platoon 1503. Route 1500 also includes environmental elements, such as a wall 1510 and/or a tunnel 1512 along or through which the platoon 1503 passes. Platoon 1503 creates aerodynamic forces that define a boundary layer/wake 1514 along the platoon 1503 and even beyond the platoon 1503. The boundary layer/wake 1514 exchanges forces with the vehicle 1506, second platoon 1508, and/or the environmental elements 1510, 1512 along the route 1500, potentially creating negative or desirable impacts, such as stability issues.

Figure 16:
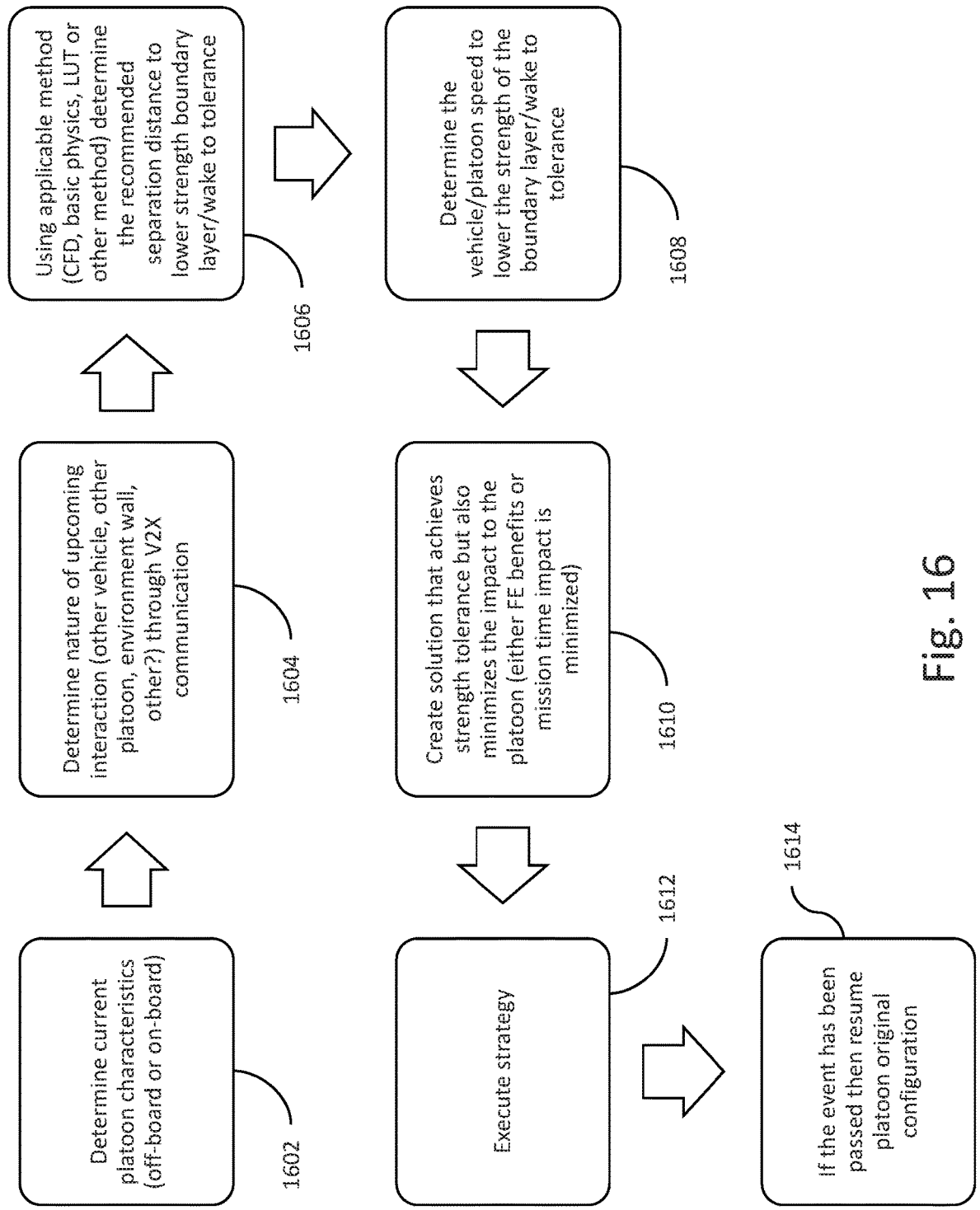
FIG. 16 is a flow diagram illustrating an example vehicle platoon control process.

FIG. 16 illustrates a flow diagram of an exemplary platoon control process 1600. As described below, process 1600 may utilize internal vehicle information, external static vehicle information, and external dynamic vehicle information. One or more of these parameters may be determined using any suitable mass estimation technique and/or system identification techniques such as vehicle parameter determination (VPD). Exemplary VPD techniques are disclosed in U.S. Pat. No. 10,000,214 referenced herein above.

In particular, the platoon control process 1600 provides an automated response to one or more operating conditions indicating an adverse impact will be caused by the forces of boundary layer/wake 1514. In general, platoon control process 1600 may adjust a formation of the platoon 1503 by decreasing the velocity of the platoon, increasing a separation distance between two or more vehicle of the platoon, or temporality dissolving the platoon, in an effort to achieve a target condition for the boundary layer/wake 1514 that reduces or minimizes adverse impacts on other vehicles 1506, other platoons 1508, and/or environmental elements 1510, 1512.

Process 1600 may include controlling a platoon comprising multiple vehicles such as platoon 1503. Process 1600 may modify the operation of a single vehicle within the platoon, of all 1600 in the platoon, or a subset of two or more vehicles of the platoon. The control process 1600 may make use of knowledge of the surrounding vehicles, the horizon data (both static and changing), telematics information, operator information, sensor data, etc. to determine the best strategy for adjusting or modifying the platoon formation to maintain or achieve a targeted boundary layer/wake condition of the platoon.

The control process 1600 may include an operation 1602 that includes determining, such as at a vehicle electronic control system (VECS) and/or a control system remote from vehicle platoon (RVC), one or more characteristics of the platoon 1503, such as length, number of vehicles, spacing between vehicles, velocity and speed, while operating along the route 1500. The control process 1600 further includes an operation 1604 to determine, with the VECS and/or RVC, the nature of one or more upcoming interactions along the route 1500. The interactions may include, for example, another vehicle 1506, another platoon 1508, and environmental conditions 1510, 1512. The determination can be provided in any suitable manner, such as V2X communication.

The control process 1600 may also determine a platoon modification parameter in response to the platoon characteristics and upcoming interactions. The control process may include an operation 1606 to determine a separation distance between vehicles of the platoon to reduce the strength of boundary layer/wake 1514. Any suitable method for making the determination is contemplated, including computational fluid dynamics analysis, basic physics analysis, look-up tables, or other methods, to determine a separate distance between vehicles that reduces the boundary layer/wake 1514 to achieve a target condition. The control process 1600 may also or alternatively include an operation 1608 to determine a speed of the platoon that reduces the boundary layer/wake 1514 to achieve a target condition.

The control process 1600 continues at operation 1610 to determine a platoon modification parameter that achieves a desired or target condition of the strength of the boundary layer/wake 1614. The platoon modification parameter can be, for example, a change in separate distance between vehicles of the platoon and/or a change of speed of the platoon. The platoon modification parameter can also be a command to dissolve the platoon if conditions warrant. The platoon modification parameter solution can also minimize or be constrained by the impact on fuel efficiency benefits or platoon mission time. The platoon is then operated in response to the platoon modification parameter at operation

1612. At operation 1614, the original platoon formation can be resumed if the event or condition causing the modification has passed the platoon.

A number of example embodiment according to the present disclosure shall now be further described. A first example embodiment is a system for controlling operation of a vehicle platoon including a plurality of vehicles. The system comprises an electronic control system configured to: determine vehicle mass values for each of the plurality of vehicles; determine nominal aerodynamic loading values for each of the plurality of vehicles; determine in-platoon vehicle separation values for each of the plurality of vehicles; determine in-platoon aerodynamic loading values for each of the plurality of vehicles; determine nominal vehicle performance for current road conditions for each of the plurality of vehicles; determine powertrain limits for each of the plurality of vehicles to emulate the lowest non-platooning transient response capability among the plurality of vehicles of the platoon; and operate each of the plurality of vehicles subject to its respective powertrain limit to provide operation of each of the vehicles of the platoon emulating the lowest non-platooning transient response capability among the plurality of vehicles of the platoon.

A second example embodiment includes the features of the first example embodiment, wherein the electronic control system comprises a plurality of control units provided on respective ones of each of the plurality of vehicles, each of the plurality of control units being configured to perform on-vehicle determinations for its respective vehicle including being configured to determine a respective vehicle mass value for its respective vehicle, to determine a respective nominal aerodynamic loading value its respective vehicle, and to determine a respective in-platoon vehicle separation value for its respective vehicle.

A third example embodiment includes the features of the second example embodiment, wherein each of the plurality of control units being configured to perform the on-vehicle determinations independently and without input from any other of the plurality of control units.

A fourth example embodiment includes the features of the second or third example embodiments, wherein the on-vehicle determinations include of the plurality of control units being configured to determine a respective in-platoon aerodynamic loading value for its respective vehicle, and determine a respective nominal vehicle performance for its respective vehicle.

A fifth example embodiment includes the features of the second, third, or fourth example embodiments, wherein the electronic control system includes a controller in operative communication with each of the plurality of control units, the controller being configured to determine a respective powertrain limit for each of the plurality of vehicles to emulate the lowest non-platooning transient response capability among the plurality of vehicles of the platoon in response to the on-vehicle determinations of each of the plurality of control units.

A sixth example embodiment includes the features of the fifth example embodiment, wherein the controller is implemented in a selected one of the plurality of control units.

A seventh example embodiment includes the features of the sixth example embodiment, wherein the plurality of control units are configured select one of the plurality of control units as the selected one of the plurality of control units.

An eighth example embodiment is a method for controlling operation of a vehicle platoon including a plurality of vehicles. The method comprises the operations of determining vehicle mass values for each of the plurality of vehicles; determining nominal aerodynamic loading values for each of the plurality of vehicles; determining in-platoon vehicle separation values for each of the plurality of vehicles; determining in-platoon aerodynamic loading values for each of the plurality of vehicles; determining nominal vehicle performance for current road conditions for each of the plurality of vehicles; determining powertrain limits for each of the plurality of vehicles to emulate the lowest non-platooning transient response capability among the plurality of vehicles of the platoon; and operating each of the plurality of vehicles subject to its respective powertrain limit to provide operation of each of the vehicles of the platoon emulating the lowest non-platooning transient response capability among the plurality of vehicles of the platoon. The method may be implemented and performed by a system according to any of the first through seventh example embodiments.

A ninth example embodiment includes the features of the eighth example embodiment, wherein each of a plurality of control units provided on respective ones of each of the plurality of vehicles, performs on-vehicle determinations for its respective vehicle including determining a respective vehicle mass value for its respective vehicle, determining a respective nominal aerodynamic loading value its respective vehicle, and determining a respective in-platoon vehicle separation value for its respective vehicle.

A tenth example embodiment includes the features of the ninth example embodiment, wherein each of the plurality of control units performs the on-vehicle determinations independently and without input from any other of the plurality of control units.

An eleventh example embodiment includes the features of the eighth or ninth example embodiments, wherein the on-vehicle determinations include of the plurality of control units determining a respective in-platoon aerodynamic loading value for its respective vehicle, and determining a respective nominal vehicle performance for its respective vehicle.

A twelfth example embodiment includes the features of the eighth, ninth, or tenth example embodiments, wherein a controller in operative communication with each of the plurality of control units determines a respective powertrain limit for each of the plurality of vehicles to emulate the lowest non-platooning transient response capability among the plurality of vehicles of the platoon in response to the on-vehicle determinations of each of the plurality of control units.

A thirteenth example embodiment includes the features of the twelfth example embodiment, wherein the controller is implemented in a selected one of the plurality of control units.

A fourteenth example embodiment includes the features of the thirteenth example embodiment, wherein the plurality of control units select one of the plurality of control units as the selected one of the plurality of control units.

A fifteenth example embodiment is a system comprising an electronic control system configured to control operation of a vehicle platoon including a plurality of vehicles by: operating an individualized predictive cruise control (IPCC) process for each of the plurality of vehicles, each IPCC process being configured to vary a respective IPCC vehicle speed set point in response to variation in vehicle aerodynamic drag, and to vary the respective IPCC vehicle speed set point independently from one another and without communicating information between one another; and operating a supervisory safety process for the vehicle platoon, the supervisory safety process including: monitoring a separation distance between a forward vehicle and a rearward vehicle, outputting a following vehicle override command to override operation of the IPCC process of the rearward vehicle in response to the monitored separation distance meeting an IPCC override threshold criterion, and terminating the following vehicle override command to permit operation of the IPCC process of the rearward vehicle to resume in response to the monitored separation distance meeting an IPCC resumption threshold criterion.

A sixteenth example embodiment comprises the features of the fifteenth example embodiment, wherein the supervisory safety process comprises a plurality of distributed safety processes implemented in a plurality of control units each on-board a respective one of the plurality of vehicles.

A seventeenth example embodiment comprises the features of the sixteenth example embodiment, wherein the supervisory safety process comprises a plurality of distributed safety processes implemented in a plurality of control units each on-board a respective one of the plurality of vehicles.

An eighteenth example embodiment comprises the features of the seventeenth example embodiment, wherein the distributed supervisory safety process is implemented as part of the IPCC process operated for each of the plurality of vehicles.

A nineteenth example embodiment comprises the features of the seventeenth example embodiment, wherein each of the plurality of control units is configured to: determine a first minimum separation distance and a first maximum separation distance for its respective vehicle relative to a forward vehicle, determine a second minimum separation distance and a second maximum separation distance for its respective vehicle relative to a forward vehicle, deactivate IPCC operation if an inter-vehicle separation distance is outside the first minimum separation distance and a first maximum separation distance for its respective vehicle, and after deactivating IPCC operation, reactivate IPCC operation if a subsequent inter-vehicle separation distance is within the second minimum separation distance and a second maximum separation distance for its respective vehicle.

A twentieth example embodiment comprises the features of the fifteenth example embodiment, wherein each of the plurality of distributed safety processes operates without using information communicated from another of the plurality of distributed safety processes.

A twenty-first example embodiment comprises the features of the fifteenth example embodiment, wherein each of the respective IPCC vehicle speed set points is determined for a future mission segment using look-ahead information.

A twenty-second example embodiment comprises the features of the fifteenth example embodiment, wherein each respective IPCC process operates without using information communicated from another IPCC process.

A twenty-third example embodiment is a method of controlling operation of a vehicle platoon including a plurality of vehicles. The method comprises: operating an individualized predictive cruise control (IPCC) process for each of the plurality of vehicles, each IPCC process being configured to vary a respective IPCC vehicle speed set point in response to variation in vehicle aerodynamic drag, and to vary the respective IPCC vehicle speed set point independently from one another and without communicating information between one another; and operating a supervisory safety process for the vehicle platoon, the supervisory safety process including: monitoring a separation distance between a forward vehicle and a rearward vehicle, outputting a following vehicle override command to override operation of the IPCC process of the rearward vehicle in response to the monitored separation distance meeting an IPCC override threshold criterion, and terminating the following vehicle override command to permit operation of the IPCC process of the rearward vehicle to resume in response to the monitored separation distance meeting an IPCC resumption threshold criterion. The method may be implemented and performed by a system according to any of the fifteenth through twenty-second example embodiments.

A twenty-fourth example embodiment comprises the features of the twenty-third example embodiment, wherein the supervisory safety process comprises a plurality of distributed safety processes implemented in a plurality of control units each on-board a respective one of the plurality of vehicles.

A twenty-fifth example embodiment comprises the features of the twenty-fourth example embodiment, wherein the supervisory safety process comprises a plurality of distributed safety processes implemented in a plurality of control units each on-board a respective one of the plurality of vehicles.

A twenty-sixth example embodiment comprises the features of the twenty-fifth example embodiment, wherein the distributed supervisory safety process is implemented as part of the IPCC process operated for each of the plurality of vehicles.

A twenty-seventh example embodiment comprises the features of the twenty-fifth example embodiment, wherein each of the plurality of control units is configured to: determine a first minimum separation distance and a first maximum separation distance for its respective vehicle relative to a forward vehicle, determine a second minimum separation distance and a second maximum separation distance for its respective vehicle relative to a forward vehicle, deactivate IPCC operation if an inter-vehicle separation distance is outside the first minimum separation distance and a first maximum separation distance for its respective vehicle, and after deactivating IPCC operation, reactivate IPCC operation if a subsequent inter-vehicle separation distance is within the second minimum separation distance and a second maximum separation distance for its respective vehicle.

A twenty-eighth example embodiment comprises the features of the twenty-third example embodiment, wherein each of the plurality of distributed safety processes operates without using information communicated from another of the plurality of distributed safety processes.

A twenty-ninth example embodiment comprises the features of the twenty-third example embodiment, wherein each of the respective IPCC vehicle speed set points is determined for a future mission segment using look-ahead information.

A thirtieth example embodiment comprises the features of the twenty-third example embodiment, wherein each respective IPCC process operates without using information communicated from another IPCC process.

A thirty-first example embodiment is a system comprising: an electronic control system configured to control operation of a vehicle platoon including a plurality of vehicles by: operating a cooperative predictive cruise control (CPCC) process for the plurality of vehicles, the CPCC process being configured to vary respective CPCC vehicle speed set points in response to variation in vehicle aerodynamic drag; and operating a supervisory safety process for the vehicle platoon, the supervisory safety process including: monitoring a separation distance between a forward vehicle and a rearward vehicle, outputting a following vehicle override command to override operation of the CPCC process of the rearward vehicle in response to the monitored separation distance meeting an CPCC override threshold criterion, and terminating the following vehicle override command to permit operation of the CPCC process of the rearward vehicle to resume in response to the monitored separation distance meeting an CPCC resumption threshold criterion.

A thirty-second example embodiment comprises the features of the thirty-first example embodiment, wherein for each of the plurality of vehicles the CPCC process determines a current inter-vehicle separation distance, obtains route information over a look-ahead window, determines grade parameters for each segment of the look-ahead window, determines optimal vehicle acceleration values for in each step of the look-ahead window based on the grade parameters, and sends a velocity change or acceleration command to a cruise control governor.

A thirty-third example embodiment comprises the features of the thirty-second example embodiment, wherein vehicles the CPCC process determines optimal vehicle acceleration values additionally on a trailing vehicle distance and a vehicle velocity.

A thirty-fourth example embodiment comprises the features of the thirty-first example embodiment, wherein the supervisory safety process is implemented as a part of the CPCC process.

A thirty-fifth example embodiment comprises the features of the thirty-fourth example embodiment, wherein the supervisory safety process is configured to, for each following vehicle of the vehicle platoon, determine a first minimum separation distance and a first maximum separation distance for its respective vehicle relative to a forward vehicle, determine a second minimum separation distance and a second maximum separation distance for its respective vehicle relative to a forward vehicle, deactivate IPCC operation if an inter-vehicle separation distance is outside the first minimum separation distance and a first maximum separation distance for its respective vehicle, and after deactivating IPCC operation, reactivate IPCC operation if a subsequent inter-vehicle separation distance is within the second minimum separation distance and a second maximum separation distance for its respective vehicle.

A thirty-sixth example embodiment comprises the features of the thirty-first example embodiment, wherein at least one of the CPCC process and the supervisor safety process are implemented in a control unit remote from and in operative communication with each of the plurality of vehicles.

A thirty-seventh example embodiment is a method of controlling operation of a vehicle platoon including a plurality of vehicles. The method comprises operating a cooperative predictive cruise control (CPCC) process for the plurality of vehicles, the CPCC process being configured to vary respective CPCC vehicle speed set points in response to variation in vehicle aerodynamic drag; and operating a supervisory safety process for the vehicle platoon, the supervisory safety process including: monitoring a separation distance between a forward vehicle and a rearward vehicle, outputting a following vehicle override command to override operation of the CPCC process of the rearward vehicle in response to the monitored separation distance meeting a CPCC override threshold criterion, and terminating the following vehicle override command to permit operation of the CPCC process of the rearward vehicle to resume in response to the monitored separation distance meeting a CPCC resumption threshold criterion. The method may be implemented and performed by a system according to any of the thirty-first through thirty-sixth example embodiments.

A thirty-eighth example embodiment comprises the features of the thirty-seventh example embodiment, wherein for each of the plurality of vehicles the CPCC process determines a current inter-vehicle separation distance, obtains route information over a look-ahead window, determines grade parameters for each segment of the look-ahead window, determines optimal vehicle acceleration values for in each step of the look-ahead window based on the grade parameters, and sends a velocity change or acceleration command to a cruise control governor.

A thirty-ninth example embodiment comprises the features of the thirty-eighth example embodiment, wherein vehicles the CPCC process determines optimal vehicle acceleration values additionally on a trailing vehicle distance and a vehicle velocity.

A fortieth example embodiment comprises the features of the thirty-seventh example embodiment, wherein the supervisory safety process is implemented as a part of the CPCC process.

A forty-first example embodiment comprises the features of the thirty-fourth example embodiment, wherein the supervisory safety process is configured to, for each following vehicle of the vehicle platoon, determine a first minimum separation distance and a first maximum separation distance for its respective vehicle relative to a forward vehicle, determine a second minimum separation distance and a second maximum separation distance for its respective vehicle relative to a forward vehicle, deactivate IPCC operation if an inter-vehicle separation distance is outside the first minimum separation distance and a first maximum separation distance for its respective vehicle, and after deactivating IPCC operation, reactivate IPCC operation if a subsequent inter-vehicle separation distance is within the second minimum separation distance and a second maximum separation distance for its respective vehicle.

A forty-second example embodiment comprises the features of the thirty-seventh example embodiment, wherein at least one of the CPCC process and the supervisor safety process are implemented in a control unit remote from and in operative communication with each of the plurality of vehicles.

While illustrative embodiments of the disclosure have been illustrated and described in detail in the drawings and foregoing description, the same is to be considered as illustrative and not restrictive in character, it being understood that only certain illustrative embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system for controlling operation of a platoon including a plurality of vehicles, the system comprising an electronic control system configured to:
   determine a non-platooning vehicle performance capability for each of the plurality of vehicles;
   determine powertrain limits for each of the plurality of vehicles to emulate a lowest non-platooning vehicle performance capability among the plurality of vehicles of the platoon;
   operate each of the plurality of vehicles subject to its respective powertrain limit to provide operation of each of the vehicles of the platoon emulating the lowest non-platooning vehicle performance capability among the plurality of vehicles of the platoon;
   wherein, the electronic control system is configured to one of:
   (a) operate an individualized predictive cruise control (IPCC) process for each of the plurality of vehicles, each IPCC process being configured to vary a respective IPCC set point in response to variation in vehicle aerodynamic drag, and to vary the respective IPCC set point independently from one another and without communicating information between one another, and operate a supervisory safety process for the platoon, the supervisory safety process being configured to monitor a separation distance between a forward vehicle and a following vehicle rearward of the forward vehicle, outputting a following vehicle override command to override operation of the IPCC process of the following vehicle in response to the monitored separation distance meeting an override threshold criterion, and terminating the following vehicle override command to permit operation of the IPCC process of the following vehicle to resume in response to the monitored separation distance meeting a resumption threshold criterion, wherein the supervisory safety process comprises a plurality of distributed safety processes implemented in a plurality of control units each on-board a respective one of the plurality of vehicles, each of the plurality of control units being configured to: determine a first minimum separation distance and a first maximum separation distance for its respective vehicle relative to a forward vehicle, determine a second minimum separation distance and a second maximum separation distance for its respective vehicle relative to a forward vehicle, deactivate IPCC operation if an inter-vehicle separation distance is outside the first minimum separation distance and a first maximum separation distance for its respective vehicle, and after deactivating IPCC operation, reactivate IPCC operation if a subsequent inter-vehicle separation distance is within the second minimum separation distance and a second maximum separation distance for its respective vehicle, and
   (b) operate a cooperative predictive cruise control (CPCC) process for the plurality of vehicles, the CPCC process being configured to vary respective CPCC set points in response to variation in vehicle aerodynamic drag, and operate a supervisory safety process for the platoon, the supervisory safety process including: monitoring a separation distance between a forward vehicle and a following vehicle rearward of the forward vehicle, outputting a following vehicle override command to override operation of the CPCC process of the following vehicle in response to the monitored separation distance meeting an override threshold criterion, and terminating the following vehicle override command to permit operation of the CPCC process of the following vehicle to resume in response to the monitored separation distance meeting a resumption threshold criterion, wherein the supervisory safety process is implemented as a part of the CPCC process and is configured to, for each following vehicle of the platoon, determine a first minimum separation distance and a first maximum separation distance for its respective vehicle relative to a forward vehicle, determine a second minimum separation distance and a second maximum separation distance for its respective vehicle relative to a forward vehicle, deactivate CPCC operation if an inter-vehicle separation distance is outside the first minimum separation distance and a first maximum separation distance for its respective vehicle, and after deactivating CPCC operation, reactivate CPCC operation if a subsequent inter-vehicle separation distance is within the second minimum separation distance and a second maximum separation distance for its respective vehicle.

2. The system of claim 1 wherein the electronic control system is configured to:
   determine vehicle mass values for each of the plurality of vehicles;
   determine nominal aerodynamic loading values for each of the plurality of vehicles; and
   determine the non-platooning vehicle performance for each of the plurality of vehicles using the vehicle mass and the nominal aerodynamic loading values for each of the plurality of vehicles.

3. The system of claim 2 wherein the electronic control system is configured to:
   determine in-platoon vehicle separation values for each of the plurality of vehicles;
   determine in-platoon aerodynamic loading values for each of the plurality of vehicles; and
   determine powertrain limits for each of the plurality of vehicles to emulate the lowest non-platooning vehicle performance capability among the plurality of vehicles of the platoon using the in-platoon aerodynamic loading values for each of the plurality of vehicles.

4. The system of claim 3 wherein the electronic control system comprises a plurality of control units provided on respective ones of each of the plurality of vehicles, each of the plurality of control units being configured to perform on-vehicle determinations for its respective vehicle including being configured to determine a respective vehicle mass value for its respective vehicle, to determine a respective nominal aerodynamic loading value its respective vehicle, and to determine a respective in-platoon vehicle separation value for its respective vehicle.

5. The system of claim 4 wherein each of the plurality of control units being configured to perform the on-vehicle determinations independently and without input from any other of the plurality of control units.

6. The system of claim 5 wherein the on-vehicle determinations include of the plurality of control units being configured to determine a respective in-platoon aerodynamic loading value for its respective vehicle, and determine a respective non-platooning vehicle performance for its respective vehicle.

7. The system of claim 4 wherein the electronic control system includes a controller in operative communication with each of the plurality of control units, the controller being configured to determine a respective powertrain limit for each of the plurality of vehicles to emulate the lowest non-platooning vehicle performance capability among the plurality of vehicles of the platoon in response to the on-vehicle determinations of each of the plurality of control units.

8. The system of claim 7 wherein the controller is implemented in a selected one of the plurality of control units.

9. The system of claim 8 wherein the plurality of control units are configured to select one of the plurality of control units as the selected one of the plurality of control units.

10. The system of claim 1, wherein the electronic control system is configured to operate an individualized predictive cruise control (IPCC) process for each of the plurality of vehicles, each IPCC process being configured to vary a respective IPCC set point in response to variation in vehicle aerodynamic drag, and to vary the respective IPCC set point independently from one another and without communicating information between one another, and operate a supervisory safety process for the platoon, the supervisory safety process being configured to monitor a separation distance between a forward vehicle and a following vehicle rearward of the forward vehicle, outputting a following vehicle override command to override operation of the IPCC process of the following vehicle in response to the monitored separation distance meeting an override threshold criterion, and terminating the following vehicle override command to permit operation of the IPCC process of the following vehicle to resume in response to the monitored separation distance meeting a resumption threshold criterion, wherein the supervisory safety process comprises a plurality of distributed safety processes implemented in a plurality of control units each on-board a respective one of the plurality of vehicles, each of the plurality of control units being configured to: determine a first minimum separation distance and a first maximum separation distance for its respective vehicle relative to a forward vehicle, determine a second minimum separation distance and a second maximum separation distance for its respective vehicle relative to a forward vehicle, deactivate IPCC operation if an inter-vehicle separation distance is outside the first minimum separation distance and a first maximum separation distance for its respective vehicle, and after deactivating IPCC operation, reactivate IPCC operation if a subsequent inter-vehicle separation distance is within the second minimum separation distance and a second maximum separation distance for its respective vehicle, and each of the plurality of distributed safety processes operates without using information communicated from another of the plurality of distributed safety processes.

11. The system of claim 1, wherein the electronic control system is configured to operate an individualized predictive cruise control (IPCC) process for each of the plurality of vehicles, each IPCC process being configured to vary a respective IPCC set point in response to variation in vehicle aerodynamic drag, and to vary the respective IPCC set point independently from one another and without communicating information between one another, and operate a supervisory safety process for the platoon, the supervisory safety process being configured to monitor a separation distance between a forward vehicle and a following vehicle rearward of the forward vehicle, outputting a following vehicle override command to override operation of the IPCC process of the following vehicle in response to the monitored separation distance meeting an override threshold criterion, and terminating the following vehicle override command to permit operation of the IPCC process of the following vehicle to resume in response to the monitored separation distance meeting a resumption threshold criterion, wherein the supervisory safety process comprises a plurality of distributed safety processes implemented in a plurality of control units each on-board a respective one of the plurality of vehicles, each of the plurality of control units being configured to: determine a first minimum separation distance and a first maximum separation distance for its respective vehicle relative to a forward vehicle, determine a second minimum separation distance and a second maximum separation distance for its respective vehicle relative to a forward vehicle, deactivate IPCC operation if an inter-vehicle separation distance is outside the first minimum separation distance and a first maximum separation distance for its respective vehicle, and after deactivating IPCC operation, reactivate IPCC operation if a subsequent inter-vehicle separation distance is within the second minimum separation distance and a second maximum separation distance for its respective vehicle, and each respective IPCC process operates without using information communicated from another IPCC process.

12. The system of claim 1, wherein the electronic control system is configured to operate a cooperative predictive cruise control (CPCC) process for the plurality of vehicles, the CPCC process being configured to vary respective CPCC set points in response to variation in vehicle aerodynamic drag, and operate a supervisory safety process for the platoon, the supervisory safety process including: monitoring a separation distance between a forward vehicle and a following vehicle rearward of the forward vehicle, outputting a following vehicle override command to override operation of the CPCC process of the following vehicle in response to the monitored separation distance meeting an override threshold criterion, and terminating the following vehicle override command to permit operation of the CPCC process of the following vehicle to resume in response to the monitored separation distance meeting a resumption threshold criterion, wherein the supervisory safety process is implemented as a part of the CPCC process and is configured to, for each following vehicle of the platoon, determine a first minimum separation distance and a first maximum separation distance for its respective vehicle relative to a forward vehicle, determine a second minimum separation distance and a second maximum separation distance for its respective vehicle relative to a forward vehicle, deactivate CPCC operation if an inter-vehicle separation distance is outside the first minimum separation distance and a first maximum separation distance for its respective vehicle, and after deactivating CPCC operation, reactivate CPCC operation if a subsequent inter-vehicle separation distance is within the second minimum separation distance and a second maximum separation distance for its respective vehicle, and at least one of the CPCC process and the supervisory safety process are implemented in a control unit remote from and in operative communication with each of the plurality of vehicles.

13. The system of claim 1 wherein the electronic control system is configured to operate a cooperative predictive cruise control (CPCC) process for the plurality of vehicles, the CPCC process being configured to vary respective CPCC set points in response to variation in vehicle aerodynamic drag, and operate a supervisory safety process for the platoon, the supervisory safety process including: monitoring a separation distance between a forward vehicle and a following vehicle rearward of the forward vehicle, outputting a following vehicle override command to override operation of the CPCC process of the following vehicle in response to the monitored separation distance meeting an override threshold criterion, and terminating the following vehicle override command to permit operation of the CPCC process of the following vehicle to resume in response to the monitored separation distance meeting a resumption threshold criterion, wherein the supervisory safety process is implemented as a part of the CPCC process and is configured to, for each following vehicle of the platoon, determine a first minimum separation distance and a first maximum separation distance for its respective vehicle relative to a forward vehicle, determine a second minimum separation distance and a second maximum separation distance for its respective vehicle relative to a forward vehicle, deactivate CPCC operation if an inter-vehicle separation distance is outside the first minimum separation distance and a first maximum separation distance for its respective vehicle, and after deactivating CPCC operation, reactivate CPCC operation if a subsequent inter-vehicle separation distance is within the second minimum separation distance and a second maximum separation distance for its respective vehicle, and the CPCC set points are CPCC vehicle speed set points.

14. A system comprising:
an electronic control system configured to control operation of a platoon including a plurality of vehicles by:
operating an individualized predictive cruise control (IPCC) process for each of the plurality of vehicles, each IPCC process being configured to vary a respective IPCC set point in response to variation in vehicle aerodynamic drag, and to vary the respective IPCC set point independently from one another and without communicating information between one another; and
operating a supervisory safety process for the platoon, the supervisory safety process including: monitoring a separation distance between a forward vehicle and a following vehicle rearward of the forward vehicle, outputting a following vehicle override command to override operation of the IPCC process of the following vehicle in response to the monitored separation distance meeting an override threshold criterion, and terminating the following vehicle override command to permit operation of the IPCC process of the following vehicle to resume in response to the monitored separation distance meeting a resumption threshold criterion, wherein the supervisory safety process comprises a plurality of distributed safety processes implemented in a plurality of control units each on-board a respective one of the plurality of vehicles, each of the plurality of control units being configured to: determine a first minimum separation distance and a first maximum separation distance for its respective vehicle relative to a forward vehicle, determine a second minimum separation distance and a second maximum separation distance for its respective vehicle relative to a forward vehicle, deactivate IPCC operation if an inter-vehicle separation distance is outside the first minimum separation distance and a first maximum separation distance for its respective vehicle, and after deactivating IPCC operation, reactivate IPCC operation if a subsequent inter-vehicle separation distance is within the second minimum separation distance and a second maximum separation distance for its respective vehicle.

15. The system of claimer 14 wherein the distributed supervisory safety process is implemented as part of the IPCC process operated for each of the plurality of vehicles.

16. The system of claim 14 wherein each of the plurality of distributed safety processes operates without using information communicated from another of the plurality of distributed safety processes.

17. The system of claim 14 wherein each of the respective IPCC set points is determined for a future mission segment using look-ahead information.

18. The system of claim 14 wherein each respective IPCC process operates without using information communicated from another IPCC process.

19. The system of claim 14 wherein the IPCC set point is an IPCC vehicle speed set point.

20. A system comprising:
an electronic control system configured to control operation of a platoon including a plurality of vehicles by:
operating a cooperative predictive cruise control (CPCC) process for the plurality of vehicles, the CPCC process being configured to vary respective CPCC set points in response to variation in vehicle aerodynamic drag; and
operating a supervisory safety process for the platoon, the supervisory safety process including: monitoring a separation distance between a forward vehicle and a following vehicle rearward of the forward vehicle, outputting a following vehicle override command to override operation of the CPCC process of the following vehicle in response to the monitored separation distance meeting an override threshold criterion, and terminating the following vehicle override command to permit operation of the CPCC process of the following vehicle to resume in response to the monitored separation distance meeting a resumption threshold criterion, wherein the supervisory safety process is implemented as a part of the CPCC process and is configured to, for each following vehicle of the platoon, determine a first minimum separation distance and a first maximum separation distance for its respective vehicle relative to a forward vehicle, determine a second minimum separation distance and a second maximum separation distance for its respective vehicle relative to a forward vehicle, deactivate-CPCC operation if an inter-vehicle separation distance is outside the first minimum separation distance and a first maximum separation distance for its respective vehicle, and after deactivating CPCC operation, reactivate-CPCC operation if a subsequent inter-vehicle separation distance is within the second minimum separation distance and a second maximum separation distance for its respective vehicle.

21. The system of claim 20 wherein, for each of the plurality of vehicles the CPCC process determines a current inter-vehicle separation distance, obtains route information over a look-ahead window, determines grade parameters for each segment of the look-ahead window, determines optimal vehicle acceleration values for in each step of the look-ahead window based on the grade parameters, and sends a velocity change or acceleration command to a cruise control governor.

22. The system of claim 21 wherein vehicles the CPCC process determines optimal vehicle acceleration values additionally on a trailing vehicle distance and a vehicle velocity.

23. The system of claim 20 wherein at least one of the CPCC process and the supervisory safety process are implemented in a control unit remote from and in operative communication with each of the plurality of vehicles.

24. The system of claim 20 wherein the CPCC set points are CPCC vehicle speed set points.

* * * * *